(12) United States Patent
Tabata

(10) Patent No.: US 8,706,412 B2
(45) Date of Patent: Apr. 22, 2014

(54) ROUTE GUIDANCE APPARATUS, ROUTE GUIDANCE METHOD, AND PROGRAM

(75) Inventor: Kiyofumi Tabata, Fujimi (JP)

(73) Assignee: JVC Kenwood Corporation (JP)

( * ) Notice: Subject to any disclaimer, the term of this patent is extended or adjusted under 35 U.S.C. 154(b) by 0 days.

(21) Appl. No.: 13/571,497

(22) Filed: Aug. 10, 2012

(65) Prior Publication Data

US 2013/0041584 A1 Feb. 14, 2013

(30) Foreign Application Priority Data

Aug. 11, 2011 (JP) ................................. 2011-175830
Jun. 8, 2012 (JP) ................................. 2012-130517

(51) Int. Cl.
*G01C 21/00* (2006.01)
*G01C 21/28* (2006.01)

(52) U.S. Cl.
USPC ........................................................ 701/431

(58) Field of Classification Search
USPC ........................... 701/419, 438, 454–460, 488
See application file for complete search history.

(56) References Cited

U.S. PATENT DOCUMENTS

| | | | |
|---|---|---|---|
| 6,163,750 A * | 12/2000 | Nojima | 701/443 |
| 7,389,182 B2 * | 6/2008 | Tomita et al. | 701/420 |
| 8,180,379 B2 * | 5/2012 | Forstall et al. | 455/456.6 |
| 8,200,429 B2 * | 6/2012 | Sasano | 701/467 |
| 8,284,748 B2 * | 10/2012 | Borghei | 370/338 |
| 8,352,178 B2 * | 1/2013 | Allen et al. | 701/410 |
| 8,554,243 B2 * | 10/2013 | Klassen et al. | 455/456.1 |
| 2007/0298815 A1 * | 12/2007 | Yamashita et al. | 455/456.1 |
| 2009/0005018 A1 * | 1/2009 | Forstall et al. | 455/414.1 |
| 2009/0143079 A1 * | 6/2009 | Klassen et al. | 455/456.3 |
| 2010/0057340 A1 * | 3/2010 | Kravets et al. | 701/201 |

FOREIGN PATENT DOCUMENTS

JP 2003139546 5/2003

* cited by examiner

*Primary Examiner* — Mary Cheung
*Assistant Examiner* — Anne Mazzara
(74) *Attorney, Agent, or Firm* — Cantor Colburn LLP

(57) ABSTRACT

A communication controller transmits current location information of a subject apparatus to another pre-registered apparatus, and receives current location information of the another pre-registered apparatus. A location relationship determiner determines whether the subject apparatus precedes the another apparatus in a heading direction. An operation mode determiner operates the subject apparatus as a main device when it is determined that the subject apparatus precedes the another apparatus in the heading direction, and operates the subject apparatus as a sub device when it is determined that the subject apparatus does not precede the another apparatus in the heading direction. A function selector activates a function of transmitting heading direction information to the another apparatus when the subject apparatus is determined to be a main device, and activates a function of receiving the heading direction information from a main device when the subject apparatus is determined to be a sub device.

6 Claims, 27 Drawing Sheets

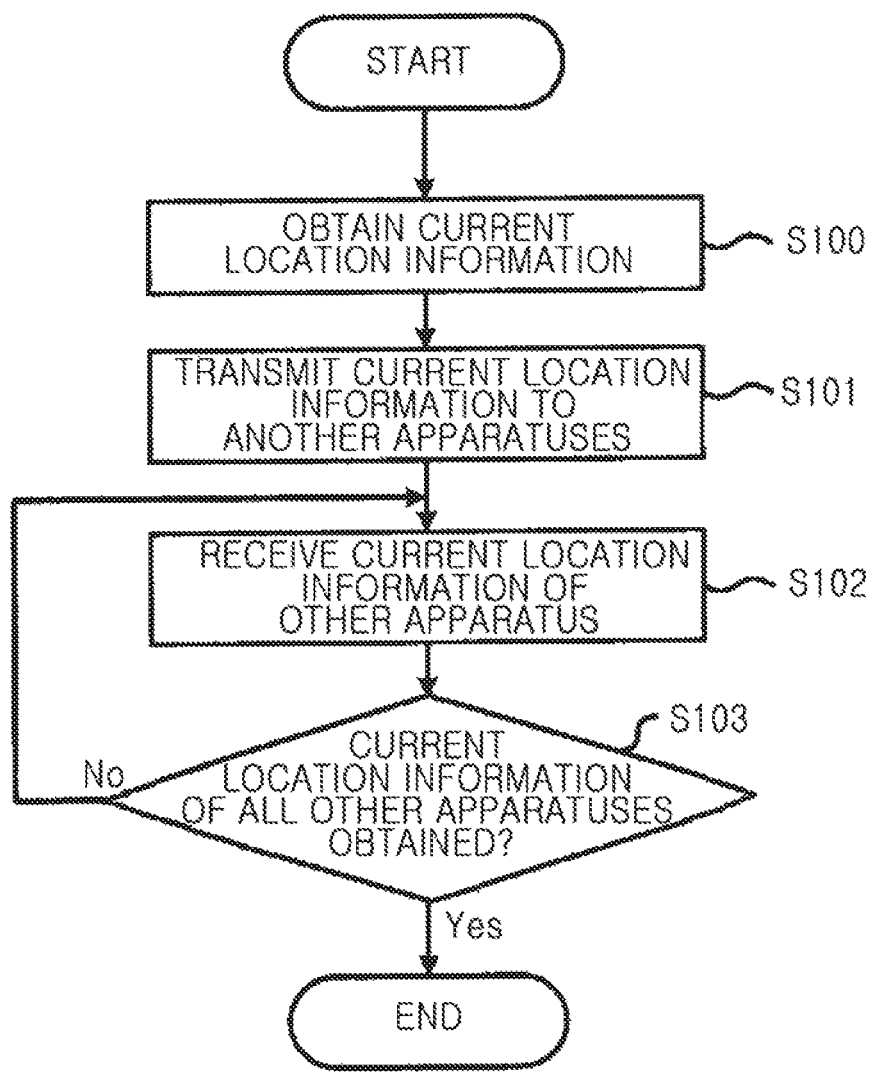

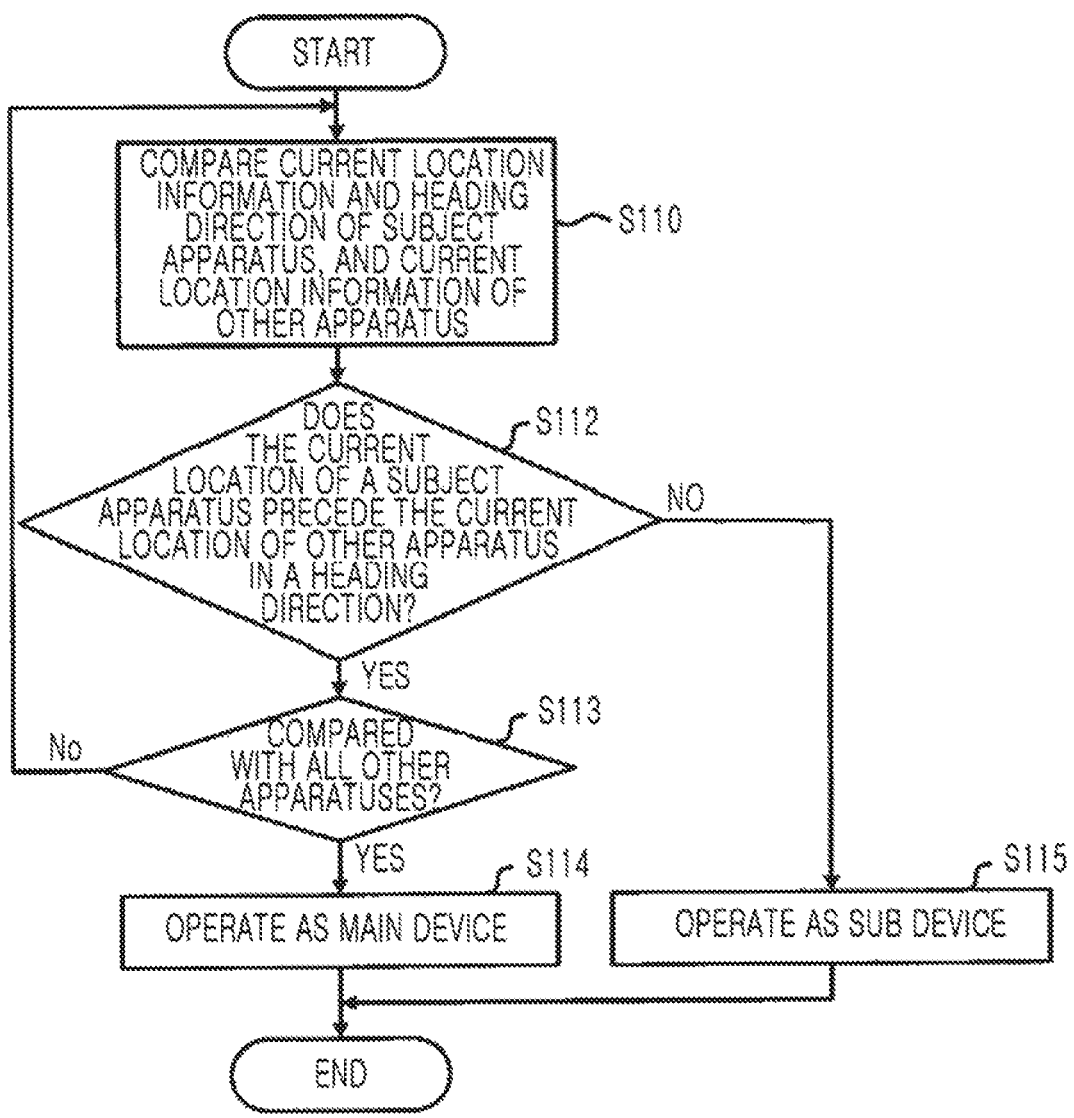

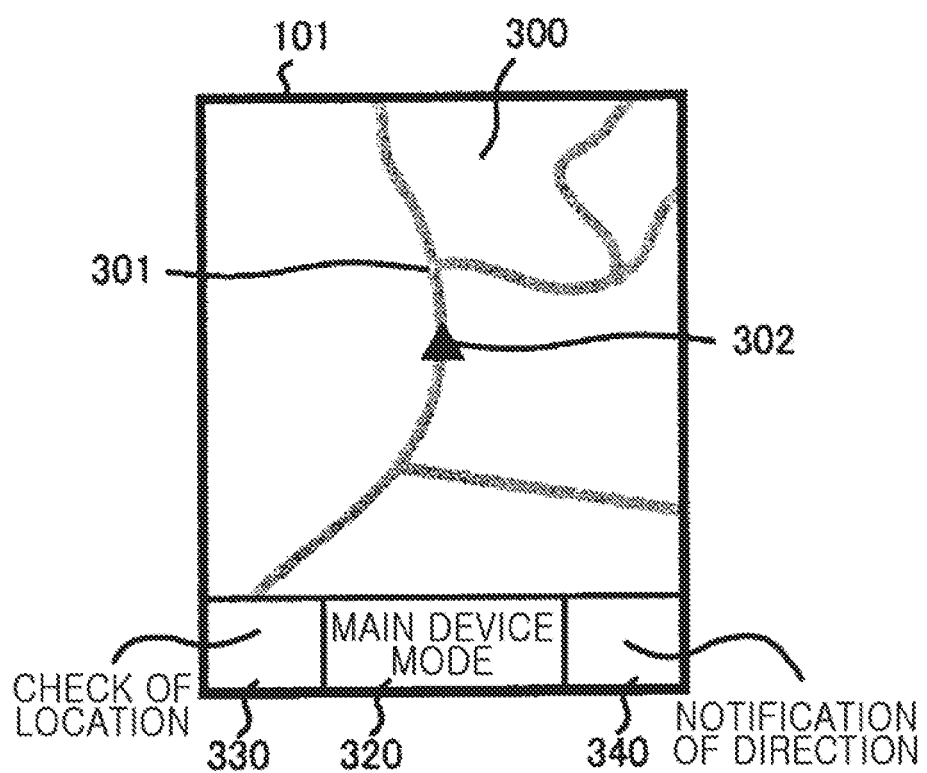

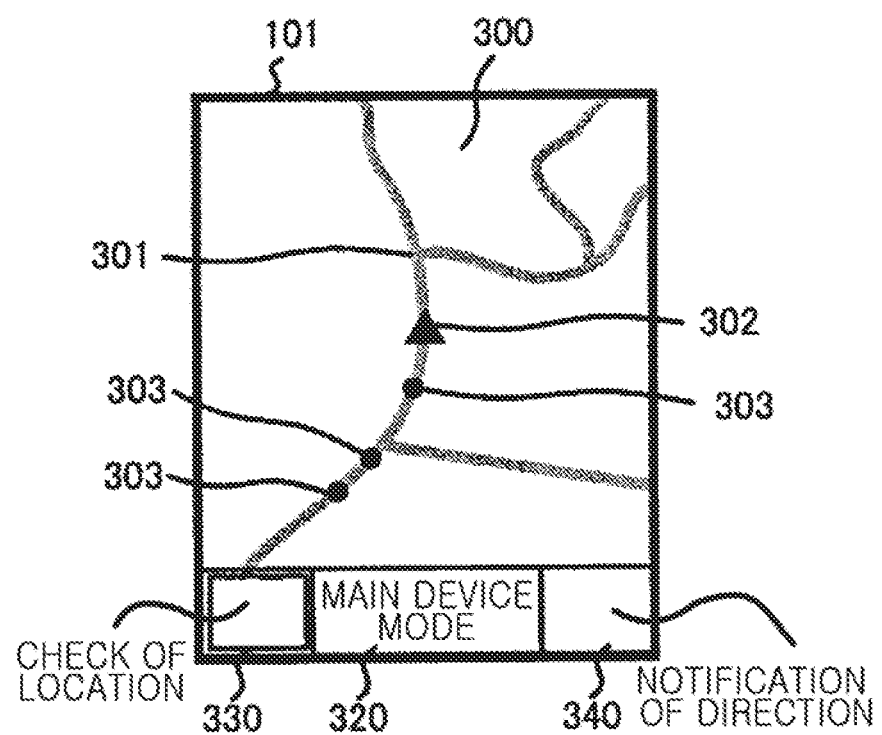

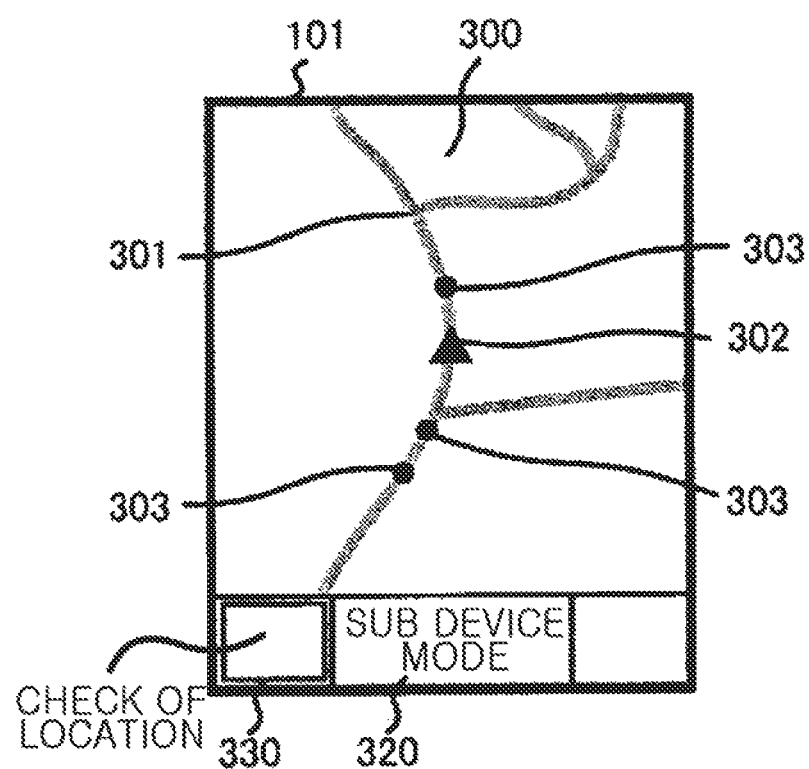

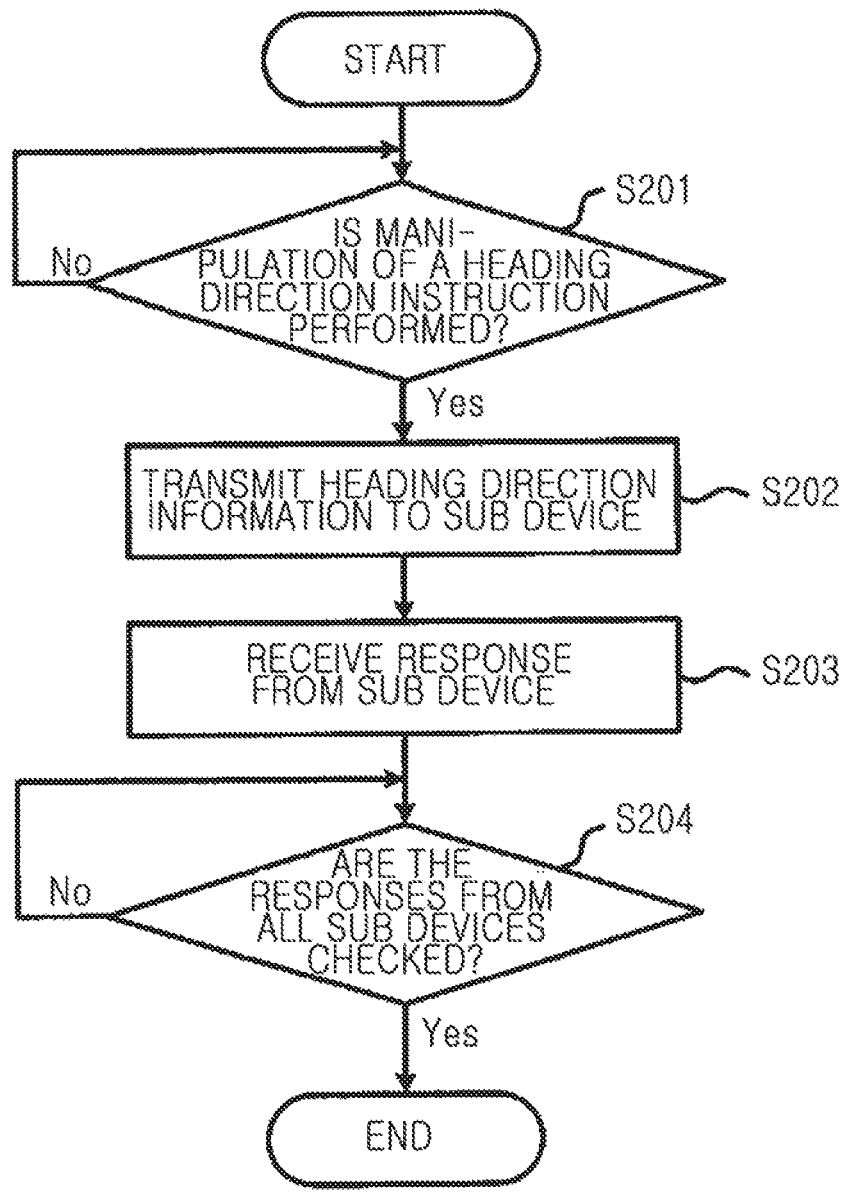

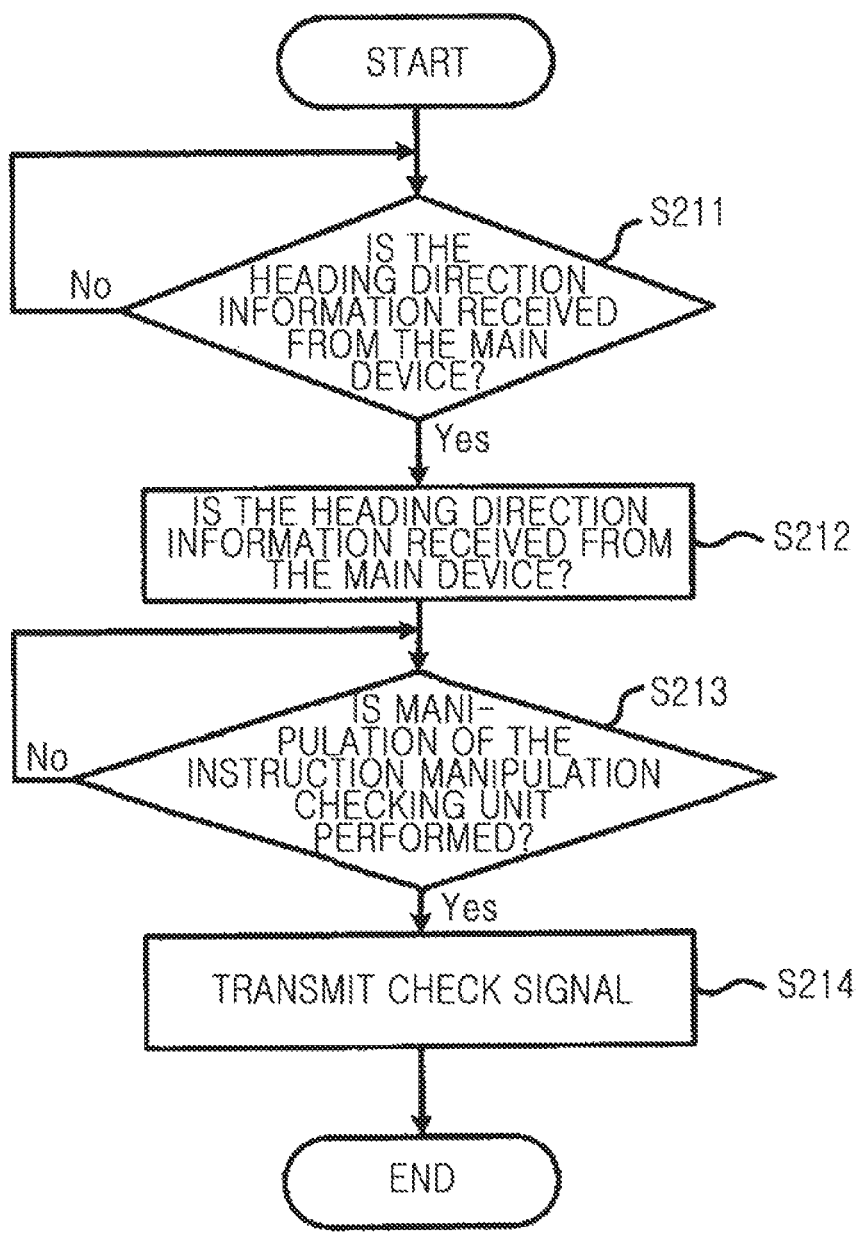

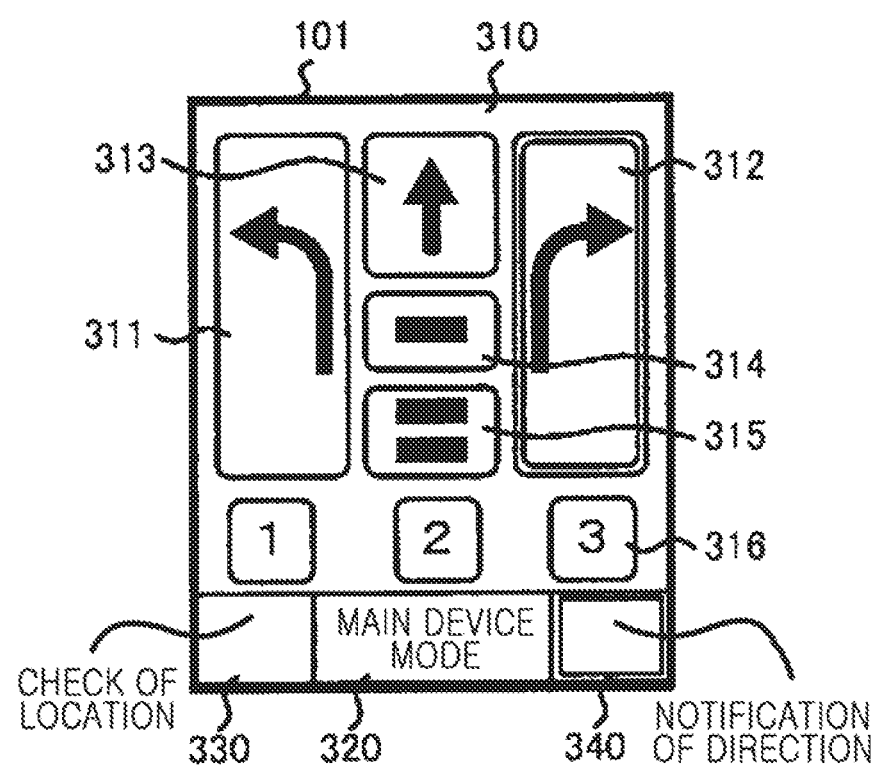

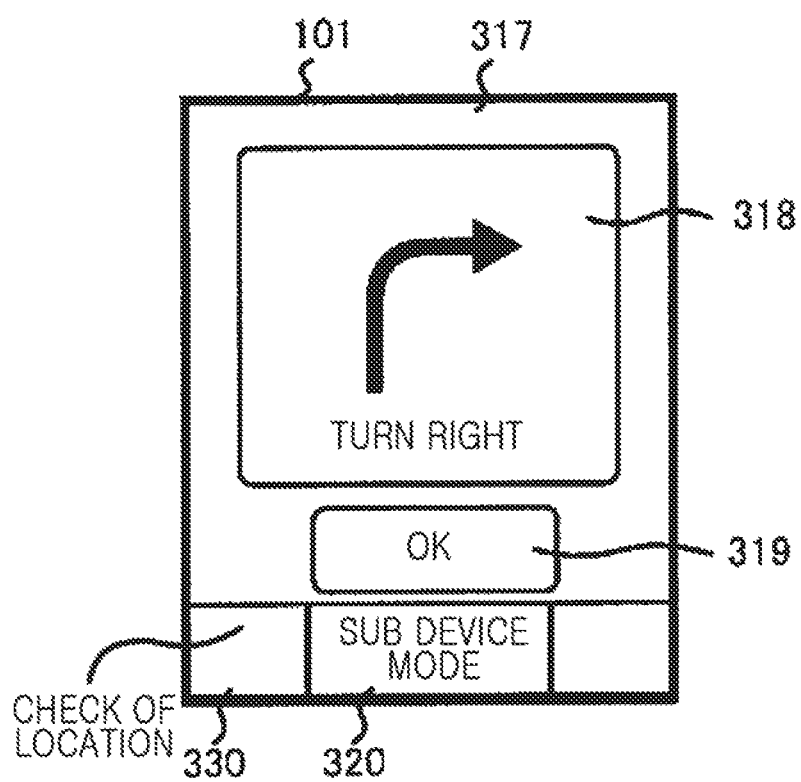

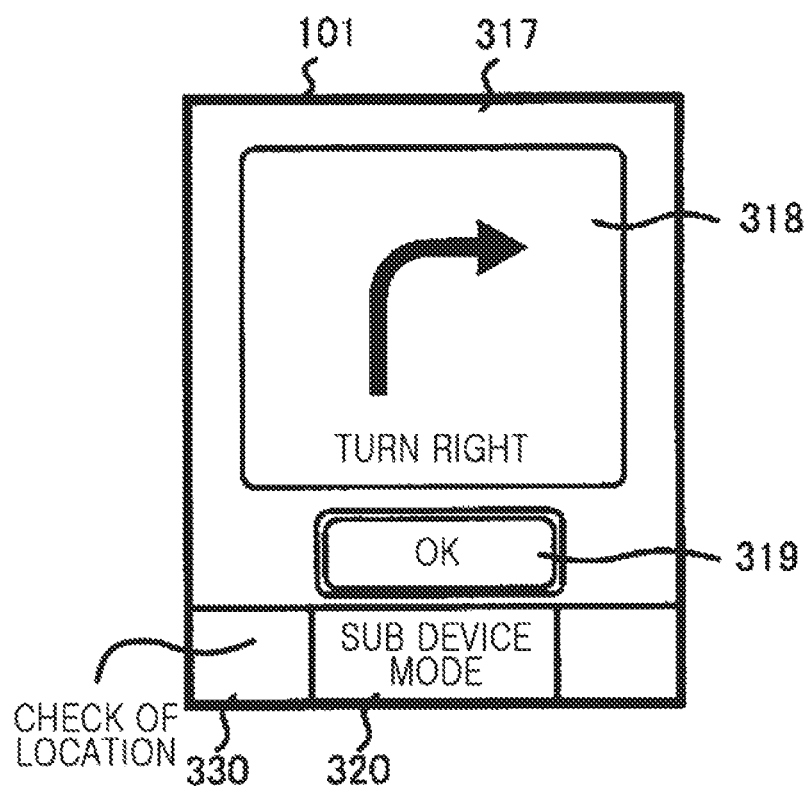

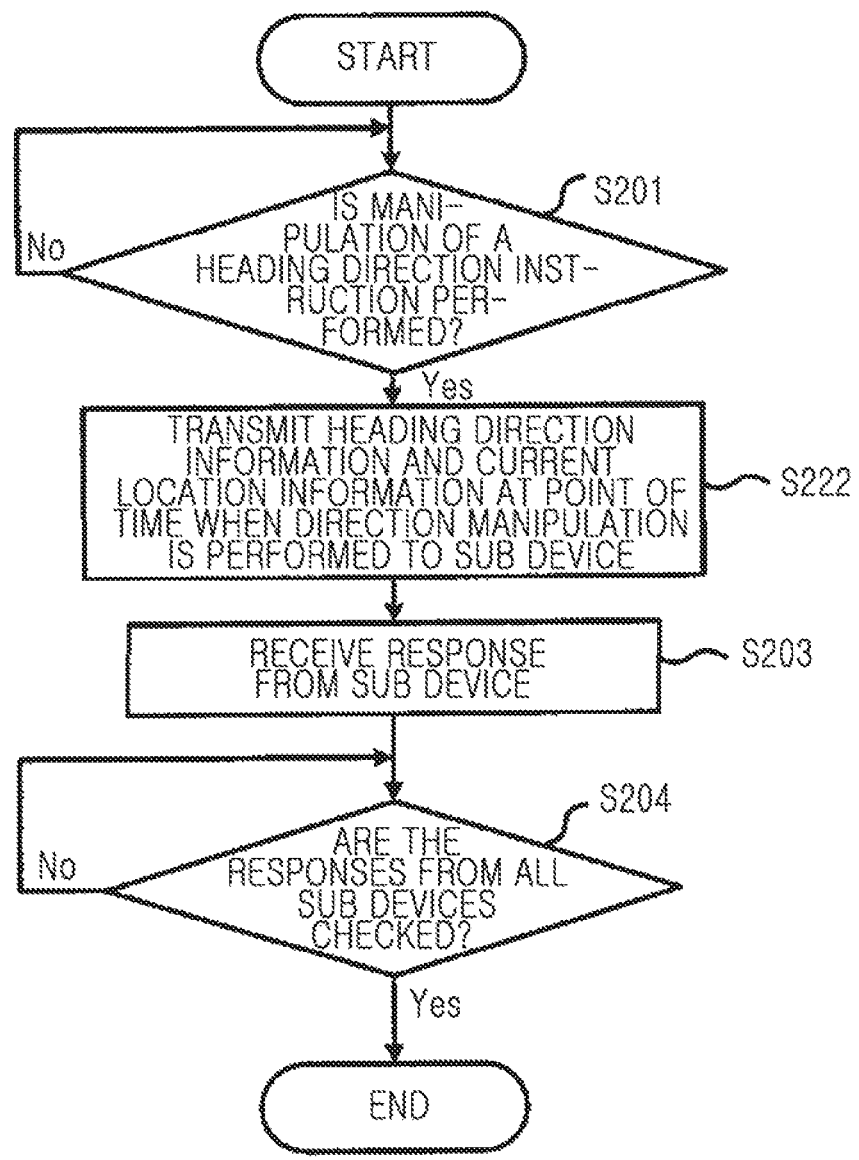

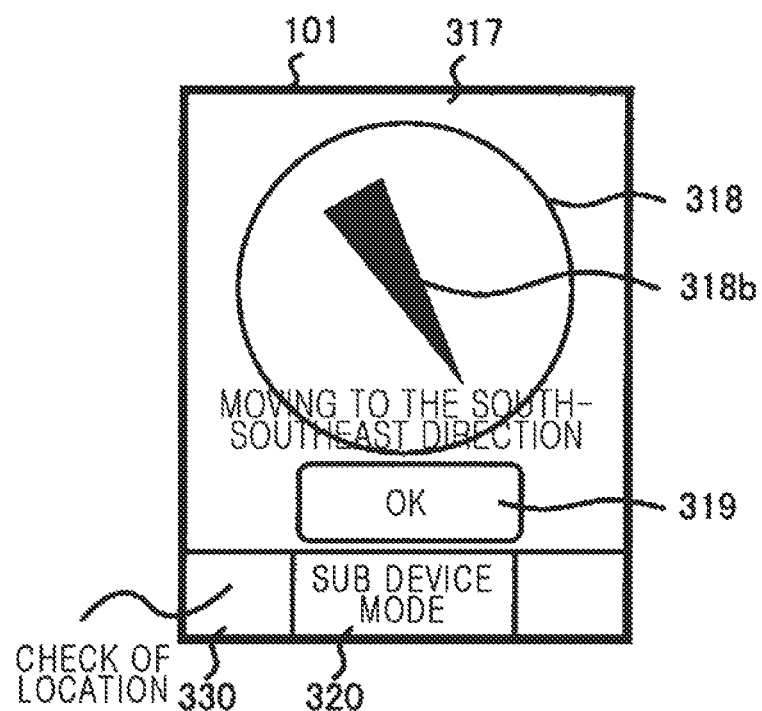

ROUTE GUIDANCE APPARATUS, ROUTE GUIDANCE METHOD, AND PROGRAM

CROSS-REFERENCE TO RELATED PATENT APPLICATIONS

This application claims the benefit of Japanese Patent Application No. 2011-175830, filed on Aug. 11, 2011 and Japanese Patent Application No 2012-130517, filed on Jun. 8, 2012, in the Japan Patent Office, the disclosures of which are incorporated herein in their entireties by reference.

BACKGROUND OF THE INVENTION

1. Field of the Invention

The present invention relates to a route guidance apparatus, a route guidance system, a route guidance method, and a program, which perform a suitable route guidance by communicating with a plurality of apparatuses.

2. Description of the Related Art

According to the supply of portable navigation devices, the navigation devices are not only used in cars, but also in bicycles or on foot. Most of such navigation devices are used independently, and even when a plurality of navigation devices communicate with each other, such communication is performed to share location information with the plurality of navigation devices (for example, refer to Patent Document 1).

In the navigation devices, location information of each navigation device is shared with the plurality of navigation devices, but route guidance is individually performed in each navigation device. Accordingly, sharing of route information between the navigation devices may be performed by, for example, using a separate voice communication, thus there may be a problem that speed or safety is decreased.

Patent Document 1) Japanese Laid-Open Patent. Publication No. 2003-139546

SUMMARY OF THE INVENTION

Considering such problems, the present invention provides a route guidance apparatus, a route guidance system, a route guidance method, and a program, which perform suitable route guidance with respect to a location relationship between the apparatuses while communicating with each apparatus.

According to an aspect of the present invention, there is provided a route guidance apparatus including: a location information obtainer which obtains current location information of a subject apparatus; a communication controller which transmits the current location information of the subject apparatus obtained by the location information obtainer to another pre-registered apparatus, and receives current location information of the another pre-registered apparatus; a location relationship determiner which determines whether the subject apparatus precedes the another pre-registered apparatus in a heading direction, based on a location relationship of the subject apparatus and the another pre-registered apparatus with respect to the heading direction of the subject apparatus, wherein the location relationship is determined according to the current location information of the subject apparatus obtained by the location information obtainer and the current location information of the another pre-registered apparatus obtained by the communication controller; an operation mode determiner which operates the subject apparatus as a main device when the location relationship determiner determines that the subject apparatus precedes the another pre-registered apparatus in the heading direction, and operates the subject apparatus as a sub device when the location relationship determiner determines that the subject apparatus does not precede the another pre-registered apparatus in the heading direction; and a function selector which enables the communication controller to transmit to the another pre-registered apparatus heading direction information indicating the heading direction when the operation mode determiner determines that the subject apparatus operates as a main device, and enables the communication controller to receive the heading direction information from the another pre-registered apparatus determined to the a main device when the operation mode determiner determines that the subject apparatus operates as a sub device.

According to another aspect of the present invention, there is provided a route guidance method including: a current location information obtaining process which obtains current location information of a subject apparatus; a location information transmitting-receiving process which mutually performs transmitting the current location information of the subject apparatus obtained in the current location information obtaining process and obtaining current location information of another apparatus, as pre-registered apparatuses communicate with each other; a location relation determination process which determines a location relationship of the subject apparatus and the another apparatus with respect to a heading direction of the subject apparatus, based on the current location information of the subject apparatus obtained in the current location information obtaining process and the current location information of the another apparatus obtained in the location information transmitting-receiving process; a operation mode determination process which operates the subject apparatus as a main device when it is determined that the subject apparatus precedes the another apparatus in the heading direction, and operates the subject apparatus as a sub device when it is determined that the subject apparatus does not precede the another apparatus in the heading direction, in the location relation determination process; and a function selection process which enables the communication controller to transmit heading direction information indicating the heading direction to the another apparatus when the subject apparatus is determined to be a main device, and enables the communication controller to receive the heading direction information from the another apparatus determined to be a main device when the subject apparatus is determined to be a sub device, in the operation mode determination process.

According to another aspect of the present invention, there is provided a program for operating a computer included in a route guidance apparatus, the program including: a current location information obtaining process which obtains current location information of a subject apparatus; a location information transmitting-receiving process which mutually performs transmitting the current location information of the subject apparatus obtained in the current location information obtaining process and obtaining current location information of another apparatus, as pre-registered apparatuses communicate with each other; a location relation determination process which determines a location relationship of the subject apparatus and the another apparatus with respect to a heading direction of the subject apparatus, based on the current location information of the subject apparatus obtained in the current location information obtaining process and the current location information of the another apparatus obtained in the location information transmitting-receiving process; a operation mode determination process which operates the subject apparatus as a main device when it is determined that the subject apparatus precedes the another apparatus in the heading direction, and operates the subject apparatus as a sub device when it is determined that the subject apparatus does not precede the another apparatus in the heading direction, in the location relation determination process; and a function selection process which enables the communication controller to transmit heading direction information indicating the heading direction to the another apparatus when the subject apparatus is determined to operate as a main device, and enables the communication controller to receive the heading direction information from the another apparatus determined to be a main device when the subject apparatus is determined to operate as a sub device, in the operation mode determination process.

BRIEF DESCRIPTION OF THE DRAWINGS

The above and other features and advantages of the present invention will become more apparent by describing in detail exemplary embodiments thereof with reference to the attached drawings in which:

FIG. 8 is a flowchart showing an operation example of a route guidance apparatus, according to a first embodiment of the present invention;

FIG. 9 is a flowchart showing an operation example of a route guidance apparatus, according to the first embodiment of the present invention;

FIGS. 10A and 10B are screen display examples in a main device and a sub device of a route guidance apparatus, according to the first embodiment of the present invention;

FIGS. 11A and 11B are screen display examples in a main device and a sub device of a route guidance apparatus, according to the first embodiment of the present invention;

FIG. 12 is a flowchart showing an operation example of a main device of a route guidance apparatus, according to the first embodiment of the present invention;

FIG. 13 is a flowchart showing an operation example of a sub device of a route guidance apparatus, according to the first embodiment of the present invention;

FIGS. 14A and 14B are screen display examples in a main device and a sub device of a route guidance apparatus, according to the first embodiment of the present invention;

FIGS. 15A and 15B are screen display examples in a main device and a sub device of a route guidance apparatus, according to the first embodiment of the present invention;

FIG. 16 is a flowchart showing an operation example of a main device of a route guidance apparatus, according to a second embodiment of the present invention;

FIGS. 22A and 22B are a screen display examples in a main device and a sub device of a route guidance apparatus, according to the fifth embodiment of the present invention.

DETAILED DESCRIPTION OF THE INVENTION

Hereinafter, a route guidance apparatus 10 according to the present invention will be described with reference to FIGS. 1 through 7.

The route guidance apparatus 10 is a navigation apparatus capable of communicating between a plurality of route guidance apparatuses 10, and each of them may be used as a general navigation apparatus. The route guidance apparatus 10 is a portable or vehicle navigation apparatus, but, alternatively, may operate as an application in various apparatuses, such as a portable phone, a smart phone, and a tablet terminal.

Figure 1:
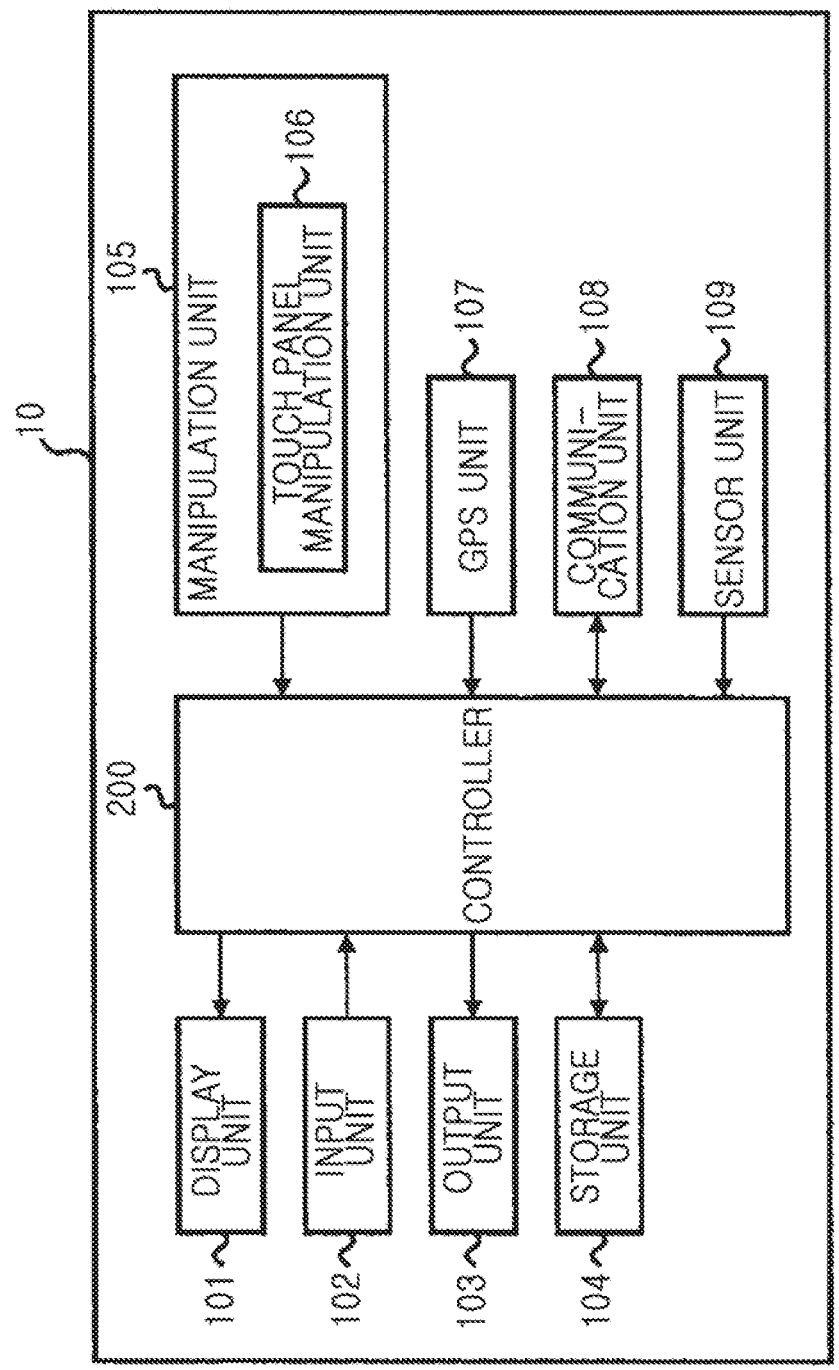
FIG. 1 is a block diagram showing a configuration example of route guidance apparatus, according to the present invention.

As shown in FIG. 1, the route guidance apparatus 10 includes a display unit 101, a storage unit 104, a manipulation unit 105, a global positioning system (GPS) unit 107, and a communication unit 108, and further includes, if required, an input unit 102, an output unit 103, a sensor unit 109, and a controller 200. Also, although not shown, the route guidance apparatus 10 includes a power supply unit for supplying power for operating each unit.

The display unit 101 includes, for example, a liquid crystal display device or an organic electroluminescence (EL) display device, and a display content or display form of the display unit 101 is controlled by a display controller 206 described below. Also, a manipulation icon or the like for indicating a manipulation location on a touch panel manipulation unit 106 is displayed on the display unit 101 according to control by the display controller 206.

The storage unit 104 stores map data displayed on the display unit 101, data about a display content, registration information for identifying another communicable route guidance apparatus 10, etc., and performs storage process or reading-out process according to control by the controller 200. The storage unit 104 includes, for example, a hard disk drive (HDD) or a flash memory. Also, the storage unit 104 may be provided in the route guidance apparatus 10, but alternatively, may be an external storage device that connects to a predetermined connecting terminal or a predetermined interface functioning as the input unit 102 or the output unit 103. Examples of the external storage device include a universal serial bus (USB) memory that connects to a USB terminal, an external HDD apparatus, and a memory card that connects via a predetermined memory card slot.

The manipulation unit 105 is a user interface for a user to instruct various processes or operations of the route guidance apparatus 10. The manipulation unit 105, for example, includes a push button type or rotating type manipulation means, and includes the touch panel manipulation unit 106 overlapping the display unit 101. A signal input to the manipulation unit 105 manipulates each unit or performs various processes of each unit based on an instruction according to a process of the controller 200.

The GPS unit 107 receives electric waves from a GPS satellite, and transmits a received signal to the controller 200. The GPS unit 107 includes a GPS antenna (not shown) that receives the electric waves from the GPS satellite. Also, the controller 200 may perform a calculation based on the signal obtained from the GPS unit 107, thereby obtaining current location information indicating a current location of the route guidance apparatus 10.

The communication unit 138 is a communication module or the like that mutually communicates with the another route guidance apparatus 10, and may be, for example, a wireless fidelity (Wi-Fi, registered trademark) line, a portable phone line, or a specific power saving wireless. The communication unit 108 includes an antenna (not shown) suitable for a used communication form. The communication unit 108 transmits and receives predetermined information via communication with the another route guidance apparatus 10 according to control by the controller 200.

Figure 2:
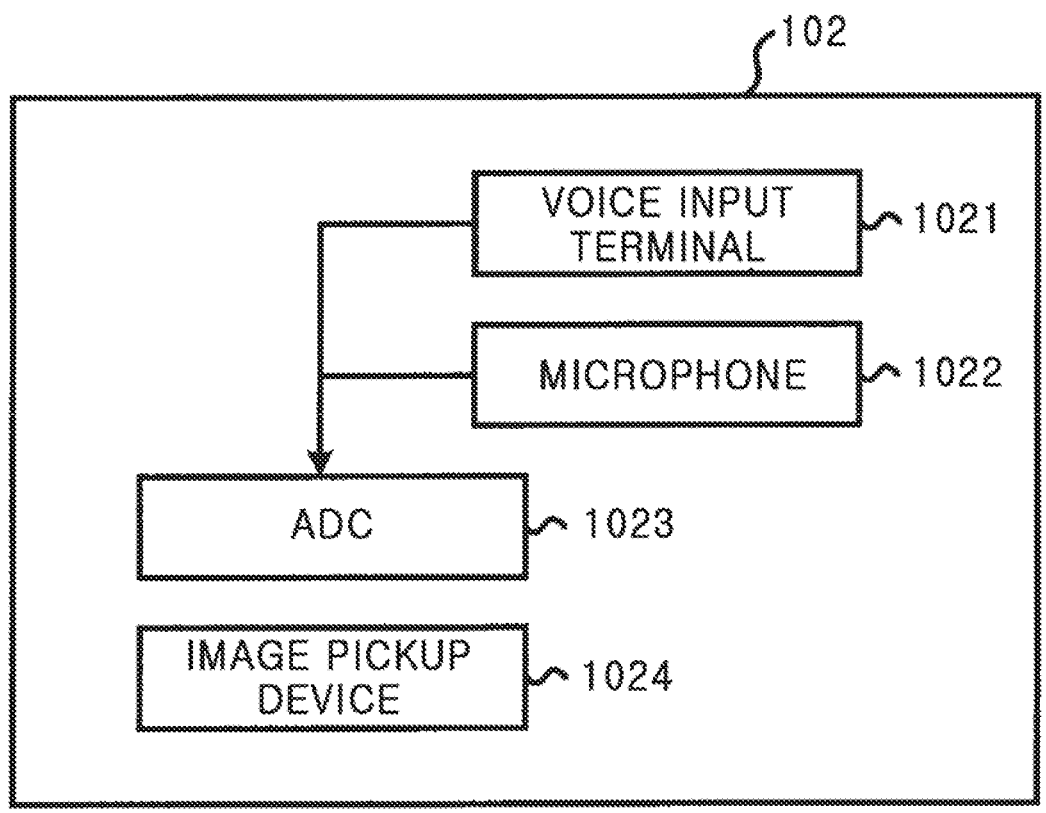
FIG. 2 is a block diagram showing a configuration example of an input unit of a route guidance apparatus, according to the present invention.

FIG. 2 is a block diagram showing a configuration example of an input unit 102. The input unit 102 is formed by a voice input terminal 1021 to which an analog voice signal, digital voice data, or image data may be input from outside the input unit 102, a microphone 1022 or an image pickup device 1024 built into the route guidance apparatus 10, or the like. Various pieces of data input from the input unit 102 are decoded or stored in the storage unit 104 by the controller 200. Also, the input unit 102 may include an analog-to-digital converter (ADC) 1023 that converts an analog signal input from outside the input unit 102 to digital data.

Figure 3:
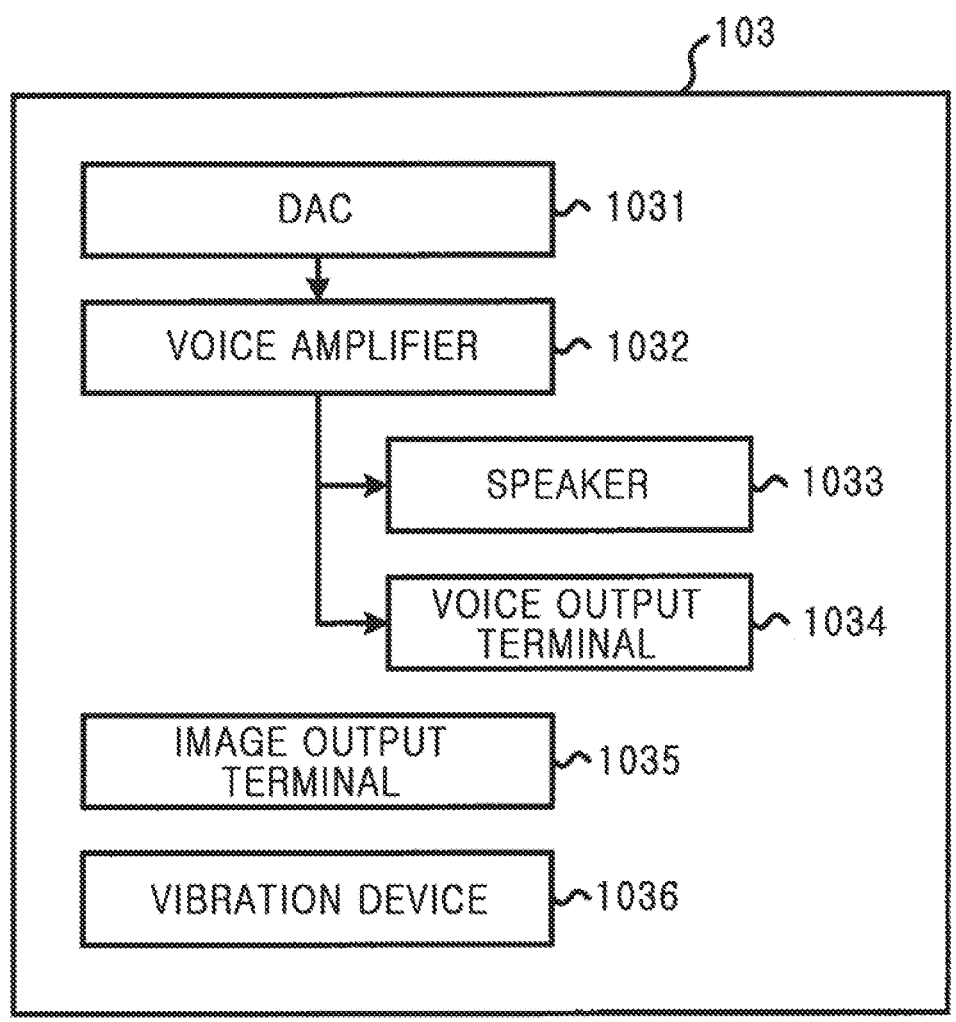
FIG. 3 is a block diagram showing a configuration example of an output unit of a route guidance apparatus, according to the present invention.

FIG. 3 is a block diagram showing a configuration example of an output unit 103. The output unit 103 is an output apparatus, an output terminal, or the like that outputs various pieces of data. The output unit 103 may include a digital-to-analog converter (DAC) 1031 that converts digital data output from the controller 200 to an analog signal, and a voice amplifier 1032 that amplifies the analog signal output by the DAC 1031 or the digital data output from the controller 200. Alternatively, the output unit 103 may be a speaker 1033 that outputs a voice signal, a voice output terminal 1034 such as headphone terminal or an image output terminal 1035 that outputs an image signal. The output 103 may further include a vibration device 1036 that output a communication with user as vibration.

The input and output units 102 and 103 may be a connector of a transportable recording medium or the like forming the storage unit 104, and for example, may be a memory card slot connected to a memory card, or a USB terminal connected to an external HDD or a USB memory, which are not shown.

Figure 4:
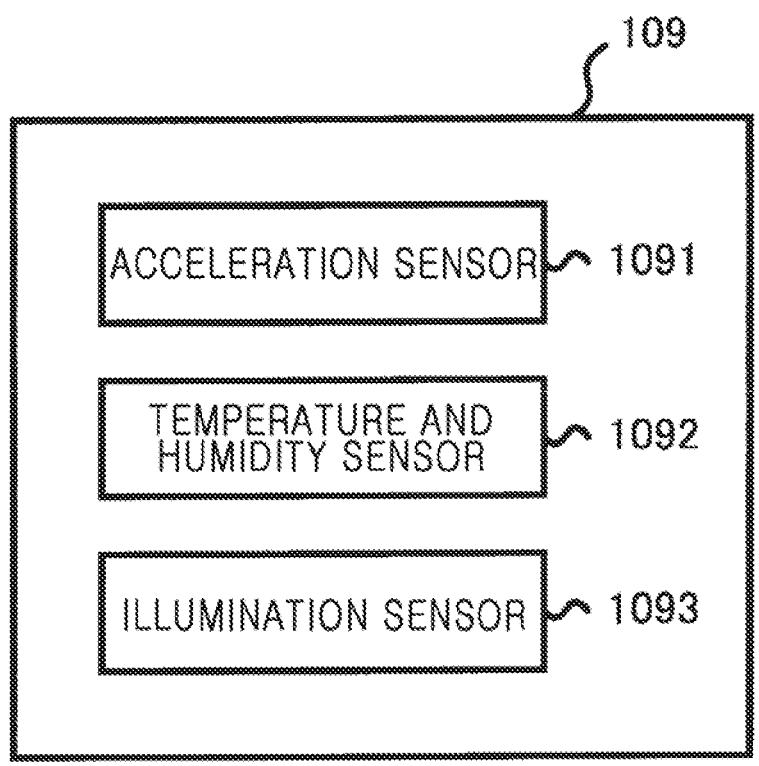
FIG. 4 is a block diagram showing a configuration example of a sensor unit of a route guidance apparatus, according to the present invention.

FIG. 4 is a block diagram showing a configuration example of an sensor unit 109. The sensor unit 109 is a sensor which detects various states of the route guidance apparatus 10, and may include, for example, an acceleration sensor 1091, a temperature and humidity sensor 1092, and an illumination sensor 1093. Outputs from various sensors are calculated by the controller 200, and a process or control according to an output value from each sensor is performed.

Figure 5:
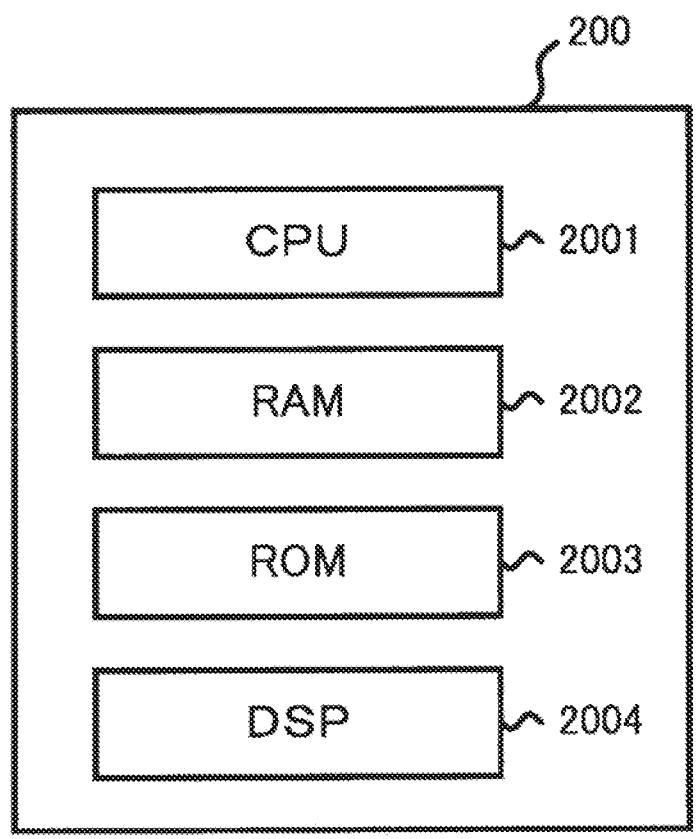
FIG. 5 is a block diagram showing a configuration example a contoller of a route guidance apparatus, according to the present invention.

FIG. 5 is a block diagram showing a configuration example of a controller 200. The controller 200 includes, for example, a central processing unit (CPU) 2001, a random access memory (RAM) 2002, read only memory (ROM) 2003, and a digital signal processor (DSP) 2004, and controls each unit of the route guidance apparatus 10, processes a signal input from each unit, or processes various pieces of data or files by executing various programs stored in the ROM 2003 on the RAM 2002

The DSP 2004 of the controller 200 performs various processes, such as sound quality compensation and image adjustment, in addition to an encoding process for converting image data or voice data input from the input unit 102 to compressed data, and a decoding process for decoding various pieces of compressed data stored in the storage unit 104

Figure 6:
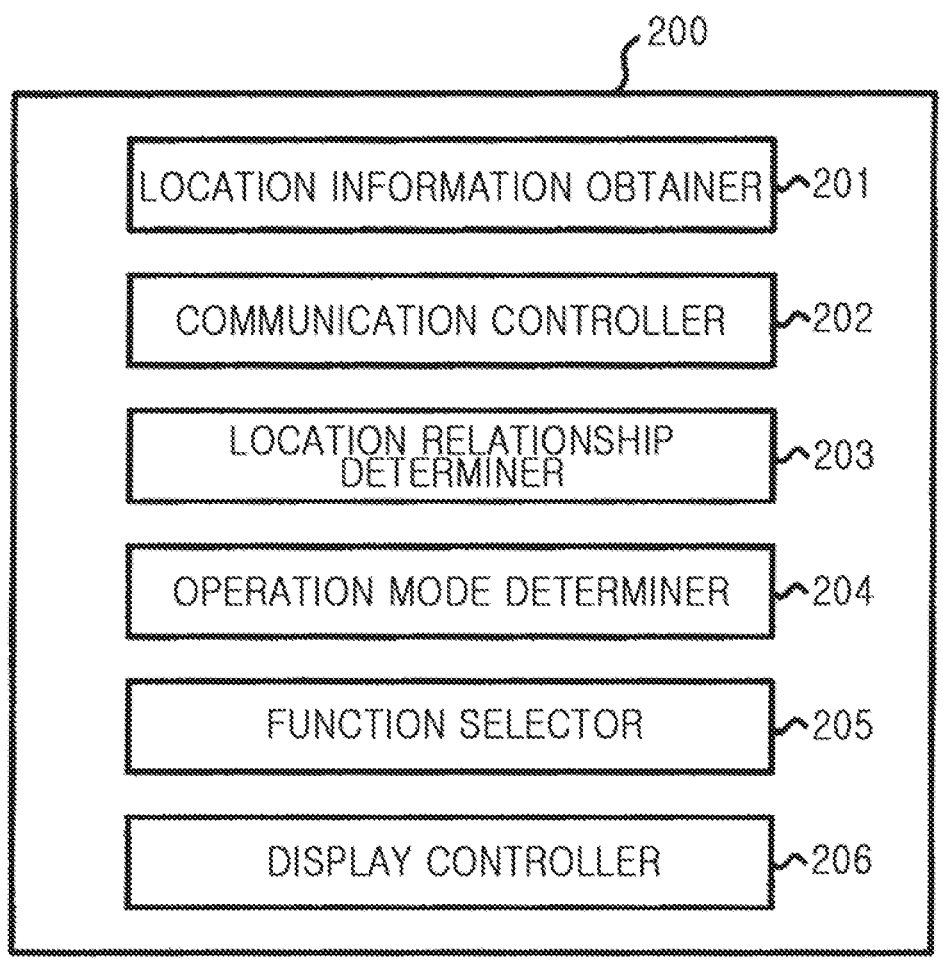
FIG. 6 is a block diagram showing a functional configuration example of a controller of a route guidance apparatus, according to the present invention.

The controller 200 performs various functions by executing the above-described program. FIG. 6 is a function block diagram showing a configuration example that is performed by the controller. The controller 200 performs functions of a location information obtainer 201, a communication controller 202, a location relationship determiner 203, an operation mode determiner 204, a function selector 205, and the display controller 206.

The location information obtainer 201 obtains a signal from a GPS satellite regarding a current location, the signal being transmitted from the GPS unit 107, and for example, obtains current location information as latitude and longitude information via calculation. The location information obtainer 201 obtains the current location information every predetermined time, for example, every 1 or 5 seconds, and the obtained current location information is stored in the storage unit 104. The time intervals or timing for obtaining the current location information is not limited to that described above, and the obtaining interval may vary according to an operation state of the route guidance apparatus 10, or the obtaining timing may be determined based on a function performed by the controller 200.

The communication controller 202 controls a transmitting and receiving operation of various pieces of information by the communication unit 108. In detail, the communication controller 202 controls the communication unit 108 to transmit current location information of a subject apparatus obtained by the location information obtainer 201 to another pre-registered route guidance apparatus 10. Also, the communication controller 202 controls the communication unit 108 to receive current location information of the another pre-registered route guidance apparatus 10. Furthermore, the communication controller 202 controls the communication unit 108 to transmit heading direction information and heading direction check information instructed by the user to the another pre-registered route guidance apparatus 10, and to received heading direction information and heading direction check information transmitted by the another route guidance apparatus 10.

In addition to transmitting and receiving information such as described above, the communication controller 202 may control a registration process between a plurality of the route guidance apparatuses 10 including the subject apparatus. For example, the registration process is a mutual registration process between apparatuses using Bluetooth (registered trademark) communication or Wi-Fi communication.

The location relationship determiner 203 determines an order of both the subject apparatus and the another route guidance apparatus 10 in a heading direction, based on the current location information of the subject apparatus obtained by the location information obtainer 201 and the current location information of the another route guidance apparatus 10 obtained via communication by the communication controller 202. In detail, it is determined whether the subject apparatus precedes the another apparatus in the heading direction or not via a location relationship in the heading direction obtained by comparing the current location information of the subject apparatus obtained by the location information obtainer 201 the heading direction based on a progress at a predetermined time of the current location information, and the current location information of the another pre-registered route guidance apparatus 10 obtained by the communication controller 202. The location relationship determiner 203 determines a location relationship whenever the location information obtainer 201 obtains the current location information and the communication controller 202 obtains the current location information of the another route guidance apparatus 10.

The operation mode determiner 204 determines whether the subject apparatus operates in a main device mode or a sub device mode, based on the result of determination by the location relationship determiner 203. In detail, the operation mode determiner 204 operates the subject apparatus in the main device mode if it is determined that the subject apparatus precedes all another pre-registered apparatuses in the heading direction. Otherwise, the operation mode determiner 204 operates the subject apparatus in the sub device mode.

The function selector 205 enables the route guidance apparatus 10 to perform a predetermined function based on an operation mode determined by the operation mode determiner 204. In detail, when the route guidance apparatus 10 operates as a main device, as an example of an operation of a main device, the route guidance apparatus 10 is capable of transmitting direction instruction information to the route guidance apparatus 10 operating as a sub device. Alternatively, when the route guidance apparatus 10 operates as a sub device, as an example of an operation of a sub device, the route guidance apparatus 10 is capable of receiving direction instruction information transmitted from the route guidance apparatus 10 operating as a main device.

The display controller 206 performs control of displaying various pieces of information on the display unit 101 included in the route guidance apparatus 18 or the display unit 101 connected to the route guidance apparatus 10. In detail, the display controller 206 displays a map screen 300 based on the current location information, various icons indicating a location or heading direction of the subject apparatus or the another apparatus on the map screen 300, a direction instruction screen 310 for the route guidance apparatus 10 determined to operate as the main device, and a direction check screen 317 for the route guidance apparatus 10 determined to operate as the sub device, and in addition, an icon, figures or characters indicating various process states or operations, or various manipulation icons corresponding to manipulation locations of the touch panel manipulation unit 106.

Figure 7:
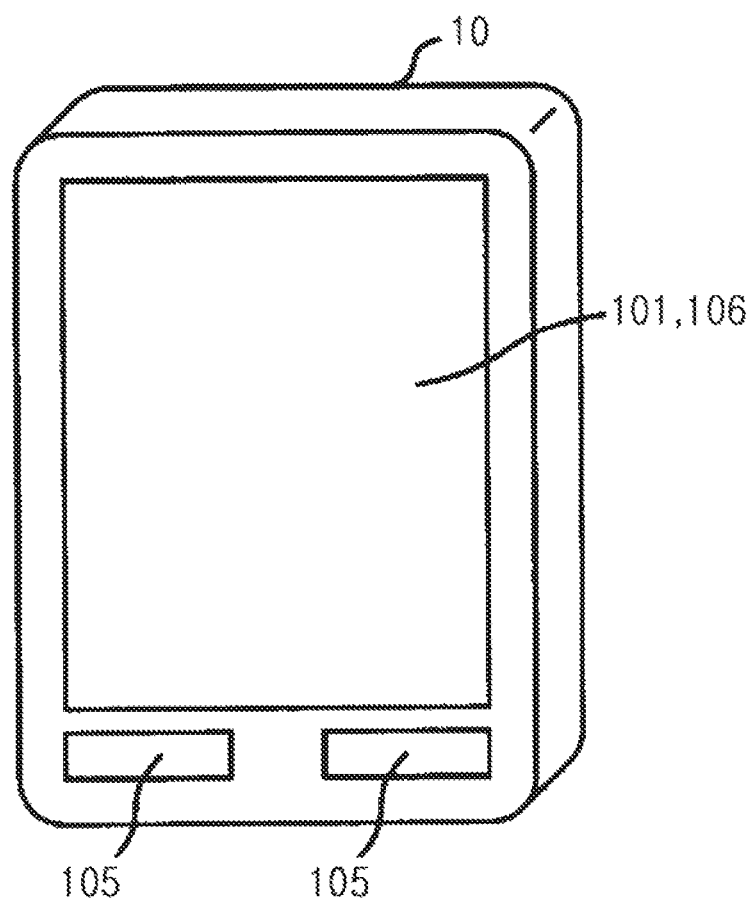
FIG. 7 is an example of an external perspective view of a route guidance apparatus, according to the present invention.

Next, an external perspective view of the route guidance apparatus 10 shown in FIG. 7 will be described. FIG. 7 is an external perspective view of an example of the route guidance apparatus 10 that is applied to a portable apparatus. The route guidance apparatus 10 shown in FIG. 7 includes, for example, a rectangular case body, and the display unit 101 and the touch panel manipulation unit 106 on one surface of the case body. The route guidance apparatus 10 further includes the manipulation unit 105.

The route guidance apparatus 10 is not limited to a rectangular shape, and may have any shape, and a surface including the display unit 101 may be flat. Also, the manipulation unit 105 may be included on any surface of the route guidance apparatus 10.

If the route guidance apparatus 10 is carried by the user or mounted on a bicycle like, the route guidance apparatus 10 may be waterproof. Also, although not shown, a mounting mechanism for mounting the route guidance apparatus 10 on a bicycle or the like may be provided on a surface opposite to the display unit 101.

Next, operations of the route guidance apparatus 10 according to a first embodiment of the present invention will be described with reference to FIGS. 8 through 15B. Each embodiment of the present invention assumes that all of the plurality of route guidance apparatuses 10 are pre-registered to each other. The plurality of route guidance apparatuses 10 are respectively owned by a plurality of users headed in the a same direction almost at the same time, and for example, are owned by a hiking or tracking group, or a cycling or touring group formed of a plurality of users.

Also, each embodiment of the present invention assumes that all of the plurality of route guidance apparatuses 10 are able to mutually communicate via the communication unit 108. A mutual communication method by the communication unit 108 may be performed via a portable phone line, or a specific power saving wireless, or like as described above, and there is no limit to communication method.

FIG. 8 is a flowchart showing an operation of sharing each piece of current location information between the subject apparatus and the pre-registered route guidance apparatus 10 after obtaining the current location information of the subject apparatus, according to the first embodiment of the present invention.

Referring to FIG. 8, the location information obtainer 201 of the route guidance apparatus 10 obtains the current location information of the subject apparatus in operation S100. The current location information is, for example, latitude and longitude information, and is obtained by calculating reception information from the GPS satellite received and output by the GPS unit 107. The location information obtainer 201 sequentially obtains the current location information of the subject apparatus at predetermined time intervals.

After obtaining the current location information in operation S100, the communication controller 202 controls the communication unit 108 to transmit the current location information obtained in operation S100 to the another pre-registered route guidance apparatuses 10, in operation S101.

After operation S101 the communication controller 202 controls the communication unit 108 to obtain each of the current location information from the another pre-registered route guidance apparatuses 10, in operation S102. Upon receiving each piece of the current location information of the another apparatuses in operation S102, the communication controller 202 determines whether the current location information of all of the another pre-registered route guidance apparatuses 10 is obtained in operation S103.

If it is determined that all of the current location information of the another route guidance apparatuses 10 are not obtained in operation S103 (operation S103: No), operation S102 is performed again. Otherwise, if it is determined that all of the current location information of the another route guidance apparatuses 10 are obtained in operation S103 (operation S103: Yes), the present process is ended.

In FIG. 8, the order of the process from operation S100 to operation S101, and the process from operation S102 to S103 may be switched, and the plurality of pre-registered route guidance apparatuses 10 may mutually share latest current location information.

The process of operation S100 in FIG. 8 corresponds to obtaining current location information, which is executed by a route guidance method performed by the route guidance apparatus 10 of the present invention and by a computer included in the route guidance apparatus 10.

The process from operation S101 through operation S103 in FIG. 8 corresponds to transmitting and receiving of location information, which is executed by the route guidance method performed by the route guidance apparatus 10 of the present invention and by the computer included in the route guidance apparatus 10.

FIG. 9 is a flowchart showing an operation of determining an operation mode according to a mutual location relationship based on location information of the subject apparatus and location information of the another apparatus, which are obtained by the operation of the route guidance apparatus 10 described with reference to FIG. 8.

In FIG. 9, the location relationship determiner 203 determines an order of the subject apparatus and the another route guidance apparatuses 10 in the heading direction by comparing the current location information of the subject apparatus obtained in operation S100 and the current location information of the another apparatuses obtained via communication by the communication controller 202, in operation S110. In operation S110, the location relationship determiner 203 determines whether each piece of the current location information of the another apparatuses exists on the heading direction or a reverse direction of the heading direction with respect to the current location information of the subject apparatus, by calculating a coordinate of the current location information of the subject apparatus and the heading direction of the subject apparatus according to a progress of a current location at a predetermined time.

After determining the location relationship in the heading direction between the current location information of the subject apparatus and pieces of the current location information of the another apparatuses in operation S110, the location relationship determiner 203 determines whether the current location of the subject apparatus precedes the current locations of the another apparatuses in the heading direction according to pieces of current location information of the another route guidance apparatuses 10, in operation S112. In operation S112, the location relationship determiner 203 determines whether coordinate information indicating the current location information of the subject apparatus exists in the heading direction with respect to coordinate information indicating the current location information of the another apparatus, and determines that the subject apparatus precedes the another apparatus if the coordinate information of the subject apparatus exists in the heading direction and determines that the subject apparatus does not precede the another apparatus if not.

In operation S112, if it is determined that the subject apparatus does not precede the another route guidance apparatus 10 (operation S112: No), the operation mode determiner 204 operates the subject apparatus in a sub device mode in operation S115 and ends the present process, since the subject apparatus does not precede any one of the another pre-registered route guidance apparatuses 10.

In operation S112 otherwise, if it is determined that the subject apparatus precedes the another route guidance apparatuses 10 (operation S112: Yes), the location relationship determiner 203 determines whether the current location information of the subject apparatus is compared with those of all the another route guidance apparatuses 10 in operation S113.

In operation S113, if it is determined that the comparing with the current location information of all the another route guidance apparatuses 10 is not completed (operation S113: No), operation S110 is performed to compare with the current location information of the another route guidance apparatus 10 that has not been compared yet. In operation S113, if it is determined that the comparing with the pieces of current location information of all the another route guidance apparatuses 10 is completed (operation S113: Yes), the operation mode determiner 204 operates the subject apparatus in a main device mode in operation S114, and ends the present process, since the subject apparatus precedes all of the pre-registered route guidance apparatuses 10 in the heading direction.

The process from operation S110 through operation S113 of FIG. 9 corresponds to process of determining a location relationship, which is executed by the route guidance method performed by the route guidance apparatus 10 of the present invention and by the computer included in the route guidance apparatus 10 of the present invention.

The process from operation S114 to operation S115 of FIG. 9 corresponds to process of determining an operation mode, which is executed by the route guidance method performed by the route guidance apparatus 10 of the invention and by the computer included in the route guidance apparatus 10.

The processes shown in FIG. 9 are sequentially performed based on latest or nearly latest current location information of each route guidance apparatus 10. Thus, the route guidance apparatus 10 that operates as a sub device operates as a main device by passing the route guidance apparatus 10 that operates as a main device in the heading direction, and the route guidance apparatus 10 that operates as a main device operates as a sub device by being passed by the route guidance apparatus 10 that operates as a sub device in the heading direction.

Figure 10B:
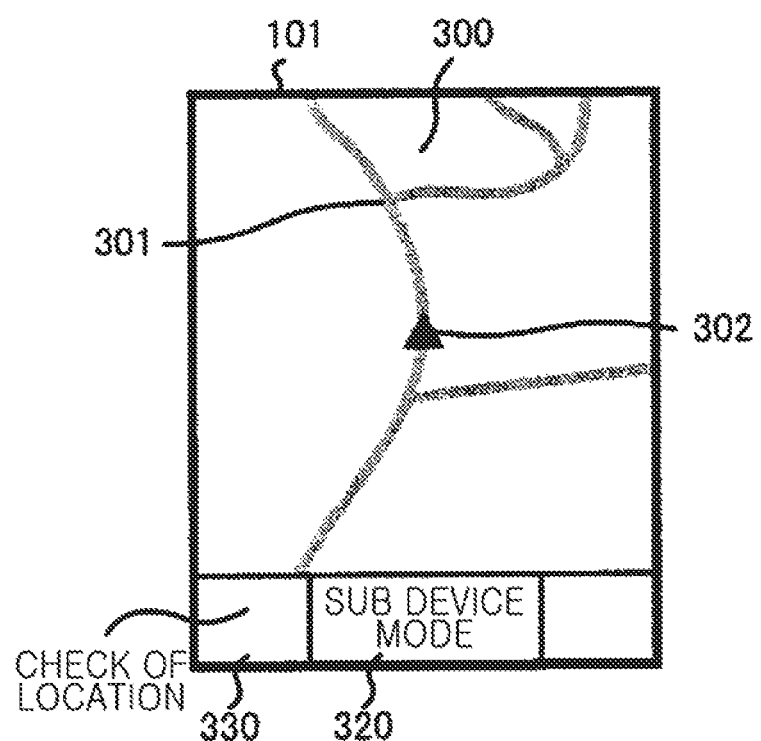

Next, display screen examples as operation examples of a main device or sub device determined via the processes of FIG. 9 will be described with reference to FIGS. 10A through 11B. In FIGS. 10A and 10B, the map screen 300 is displayed on the display unit 101, and the current location of the subject apparatus is displayed as a subject location icon 302 on the map screen 300. Also, FIG. 10A is a display example when the route guidance apparatus 10 operates as a main device, and FIG. 10B is a display example when the route guidance apparatus 10 operates as a sub device.

In FIGS. 10A and 10B, the subject location icon 302 is displayed almost at a center of the map screen 300 and a heading direction thereof faces a top of the display unit 101. Accompanied by movement of the route guidance apparatus 10, the map screen 300 is moved and rotated while always displaying the latest current location of the route guidance apparatus 10 at the center and the heading direction towards the top of the display unit 101. Also, an intersection 301 is displayed on the map screen 300.

In addition to the map screen 300, a mode display unit 320, a location check manipulation unit 330, and a direction notification manipulation unit 340 are displayed on the display unit 101. The direction notification manipulation unit 340 is not displayed in a sub device. The location check manipulation unit 330 and the direction notification manipulation unit 340 are manipulation icons manipulatable by the touch panel manipulation unit 106. The location check manipulation unit 330 and the direction notification manipulation unit 340 may not be manipulated by the touch panel manipulation unit 106, and may be manipulated by the manipulation unit 105 provided on the case body of the route guidance apparatus 10, or a remote control apparatus (not shown).

When the subject apparatus operates as a main device, the mode display unit 320 displays a main device mode, and when the subject apparatus operates as a sub device, the mode display unit 320 displays a sub device mode. The location check manipulation unit 330 is manipulated so that the current locations of the another route guidance apparatuses 10 are displayed on the map screen 300 as shown in FIGS. 11A and 11B. The direction notification manipulation unit 340 is manipulated to display the direction instruction screen 310, as shown in FIG. 14A, so as to instruct a direction.

When the location check manipulation unit 330 is manipulated by a user at a state of FIGS. 10A and 10B, the display controller 206 displays the current location of the another route guidance apparatus 10 on the map screen 300 as another apparatus location icon 303, based on the current location information of the another route guidance apparatus 10 obtained by the communication controller 202, as shown in FIGS. 11A and 11B. A state of the location check manipulation unit 330 shown in FIGS. 11A and 10B is an example of a state showing that a location check can be performed by manipulating the location check manipulation unit 330 by the user.

In FIG. 11A, since the subject apparatus operates as a main device, the another apparatus location icons 303 as a sub device are displayed behind the subject location icon 302 in the heading direction. In FIG. 11B, since the subject apparatus operates as a sub device, the another apparatus location icon 303 as a main device is displayed in front of the subject location icon 302 in the heading direction, and the another apparatus location icons 303 as a sub device are displayed behind the subject location icon 302 in the heading direction.

FIGS. 12 and 13 show processes when the direction notification manipulation unit 340 is manipulated in the state shown in FIGS. 10A and 10B or 11A and 11B. FIGS. 14A through 15B show examples displayed when performing operations of FIGS. 12 and 13.

Each process in FIGS. 12 and 13 corresponds to a process of selecting a function, which is executed by the route guidance method performed by the route guidance apparatus 10 of the present invention and by the computer included in the route guidance apparatus 10.

The processes of FIG. 12 assume that the user manipulates the direction notification manipulation unit 340 of the route guidance apparatus 10 determined to operate as a main device. When the direction notification manipulation unit 340 is manipulated, the direction instruction screen 310 shown in FIG. 14A is displayed in the main device.

A state of the direction notification manipulation unit 340 in FIG. 14A is an example of a state showing that direction notification can be performed via manipulating the direction notification manipulation unit 340 by the user. A left turn instruction manipulation unit 311, a right turn instruction manipulation unit 312, a straight movement instruction manipulation unit 313, a stop instruction manipulation unit 314, and a deceleration instruction manipulation unit 315 are displayed according to a direction to be instructed, and further, a sub device information display unit 316 is displayed on the direction instruction screen 310 displayed on the display unit 101 of the main device by manipulating the direction notification manipulation unit 340. The left turn instruction manipulation unit 311, the right turn instruction manipulation unit 312, the straight movement instruction manipulation unit 313, the stop instruction manipulation unit 314, and the deceleration instruction manipulation unit 315 are manipulation icons manipulatable by the touch panel manipulation unit 106.

In FIG. 14A, the left turn instruction manipulation unit 311 is manipulated to notify a sub device to turn left. The right turn instruction manipulation unit 312 is manipulated to notify a sub device to turn right. The straight movement instruction manipulation unit 313 is manipulated to notify a sub device to move straight. The stop instruction manipulation unit 314 is manipulated to notify a sub device to stop. The deceleration instruction manipulation unit 315 is manipulated to notify a sub device to decelerate. The sub device information display unit 316 displays the number of sub device information display units 316 matching the number of registered sub devices, and distinguishes and displays an existence of a check signal received from a sub device according to a direction instruction manipulation.

In FIG. 12, the controller 200 first, determines whether manipulation of instructing the heading direction is performed in operation S201. The manipulation of instructing the heading direction is manipulation by the touch panel manipulation unit 106 with respect to any one of the left turn instruction manipulation unit 311, the right turn instruction manipulation unit 312, the straight movement instruction manipulation unit 313, the stop instruction manipulation unit 314, and the deceleration instruction manipulation unit 315 displayed on the display screen of FIG. 14A.

FIG. 14A shows an example of state that the right turn instruction manipulation unit 312 is manipulated in operation S201. Such an instruction by the user is performed when the user of the route guidance apparatus 10 as the main device, for example, checks an intersection in the heading direction with the eyes or via a display of the map screen 300, and notifies the user of the route guidance apparatus 10 as a sub device about the heading direction at the intersection. However, the instruction is not limited to an intersection, and a stop instruction by the stop instruction manipulation unit 314, a deceleration instruction by the deceleration instruction manipulation unit 315, or the like may be performed as occasion demands.

If it is determined that the manipulation of instructing the heading direction is not performed in operation S201 (operation S201: No), the determination in operation S201 is performed again. Otherwise, if it is determined that the manipulation of instructing the heading direction is performed in operation S201 (operation S201: Yes), the communication controller 202 enables the communication unit 108 to transmit the heading direction information about the manipulation of instructing the heading direction performed in operation S201 to the another route guidance apparatus 10 in operation S202.

The another route guidance apparatuses 10 to which the heading direction information is transmitted in operation S202 are the route guidance apparatuses 10 that are determined to operate as a sub device from among the pre-registered route guidance apparatuses 10. Upon transmitting the heading direction information to the sub device in operation S202, responses based on checking the heading direction information are received from the route guidance apparatuses 10 that are a sub devices in operation S203.

Figure 15A:
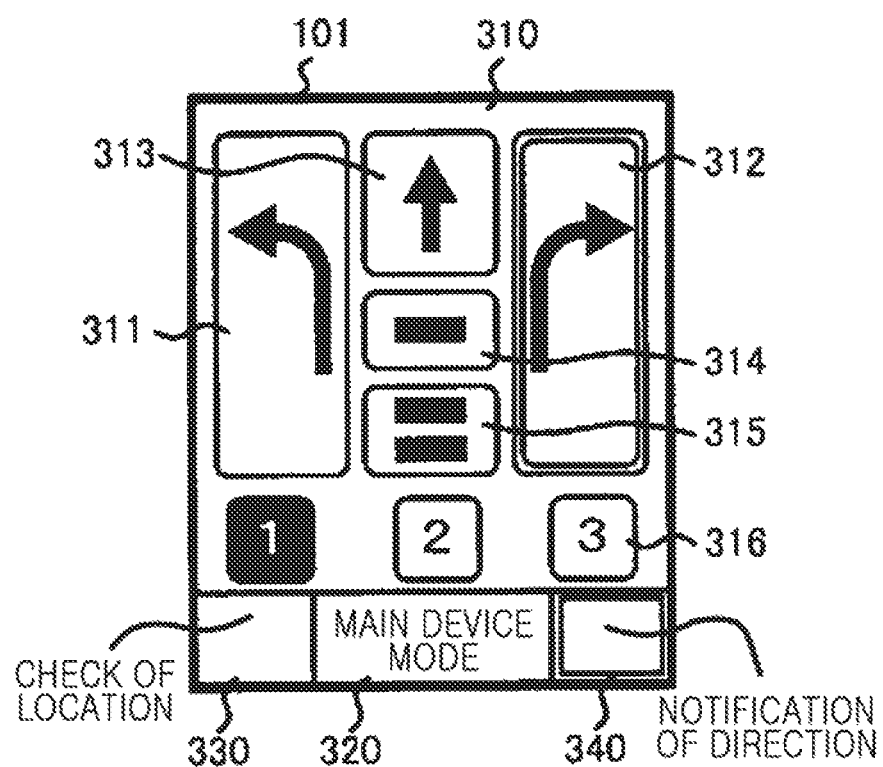

In operation S203, when the responses regarding the notified heading direction information are received from the route guidance apparatuses 10 as a sub device, a state of an icon corresponding to a sub device that transmits the response is changed on the sub device information display unit 316, as shown in FIG. 15A. Accordingly, it can be determined that the user of the route guidance apparatus 10 as a sub device that is behind checked the heading direction.

Three sub device information display units 316 are displayed if there are three route guidance apparatuses 10 determined to operate as sub devices from among the route guidance apparatuses 10 registered mutually. A number is displayed on the sub device information display unit 316, and here, the sub device information display units 316 may be assigned from 1 in an order of receiving responses from sub devices, or numbers may be pre-assigned to each of the route guidance apparatuses 10 while being mutually registered, and the sub device information display units 316 may display the assigned numbers. In this case, when the route guidance apparatus 10 assigned with a number 1 is determined to operate as a main device, the sub device information display units 316 having numbers other than 1 are displayed.

While the response is received from the route guidance apparatus 10 as a sub device in operation S203, the communication controller 202 determines whether there are responses from all of the route guidance apparatuses 10 as sub devices from among the pre-registered route guidance apparatuses 10, in operation S204.

In operation S204, if the responses from all sub devices have not been checked (operation S204: No), the process in operation S204 is performed again. However, since the response from the sub device is transmitted by the user of the sub device, the response may not be definitely transmitted without fail. Thus, if a predetermined time has passed from a point of time when the direction instruction manipulation is performed in operation S201 or a predetermined distance has been traveled, operation S204 may be stopped from being pertained. Alternatively, if the direction instruction manipulation in operation S201 was an instruction to turn left or right, or to move straight, operation S204 may be stopped from being performed when it is determined that the subject apparatus has passed the intersection existing in the heading direction from a location where the direction instruction manipulation was performed, based on the current location information of the subject apparatus obtained by the location information obtainer 201.

In operation S204, if the responses from all sub devices have been checked (operation S204: Yes) or operation S204 is stopped from being performed, the present process is ended.

The processes of FIG. 13 start by receiving the heading direction information from a main device by the communication controller 202, while the route guidance apparatus 10 determined to operate as a sub device is in a state, for example, shown in FIG. 108 or 11B. In FIG. 13, it is determined whether the communication controller 202 received the heading direction information from a main device in operation S211. The transmitting of the heading direction information from the main device, determined in operation S211, is based on operation S202 of FIG. 12.

In operation S211, if it is determined that the heading direction information has not been received from the main device (operation S211: No), operation S211 is performed again. Otherwise, if it is determined that the heading direction information has been received from the main device (operation S211: Yes), the display controller 206 displays the direction check screen 317 shown in FIG. 146 on the display unit 101 and displays a direction instruction arrow 318a indicating the heading direction based on the heading direction information received from the main device on an instruction display unit 318 of the direction check screen 317 in operation S212.

The direction check screen 317 shown in FIG. 14B includes the instruction display unit 318 for displaying the heading direction information transmitted from the main device, and an instruction manipulation checking unit 319 for transmitting a response of checking the heading direction information displayed on the instruction display unit 318 to the main device.

When the heading direction information is displayed in operation S212, the controller 200 determines whether the instruction manipulation checking unit 319 is manipulated in operation S213. In operation S213, if it is determined that the instruction manipulation checking unit 319 has not been manipulated (operation S213: No), operation S213 is performed again. In operation S213, otherwise, if it is determined that the instruction manipulation checking unit 319 has been manipulated (operation S213: Yes), the communication controller 202 enables the communication unit 108 to transmit a check signal generated by manipulating the instruction manipulation checking unit 319 in operation S214, and the present process is ended. The check signal transmitted in operation S214 is checked via operation S203 in the main device.

A state of the instruction manipulation checking unit 319 in FIG. 158 is an example of a state showing that the user manipulated the instruction manipulation checking unit 319. By this process, the sub device information display unit 316 of the main device displays that there was a response from the sub device, as shown in FIG. 15A.

Since the process of operation S213 is based on the manipulation of the instruction manipulation checking unit 319 by the user, operation S213 may not be definitely performed without fail. Thus, if a predetermined time has passed from a point of time when the heading direction information is displayed in operation S212 or a predetermined distance has been traveled, the process of operation S213 may be stopped from being performed and the present process may be ended without performing the process of operation S214.

The flow of processes in the main device and the sub device of the present embodiment will now be described by using a location relationship of the main device and the sub device shown in FIGS. 11A and 11B. The map screen 300 shown in FIG. 11A is displayed on the route guidance apparatus 10 as a main device, and the map screen 300 shown in FIG. 11B is displayed on the route guidance apparatus 10 as a sub device moving behind the main device. Here, when the user of the main device decides to turn right at the intersection 301, the user touches and manipulates the direction notification manipulation unit 340 to display the direction instruction screen 310 of FIG. 14A. When the user of the main device displaying the direction instruction screen 310 touches and manipulates the right turn instruction manipulation unit 312 at a location before reaching the intersection 301 shown in FIG. 11A, the direction check screen 317 shown in FIG. 158 is displayed on the sub device at a location shown in FIG. 11B.

Next, as shown in FIG. 15B, when the user of the sub device, who checked the display of the direction check screen 317, touches and manipulates the instruction manipulation checking unit 319, the display of the sub device information display unit 316 of the main device is changed as shown in FIG. 15A, and thus, the user of the main device may determine that the user of the sub device corresponding to the number 1 has checked the right turn instruction.

According to the operations described above, the plurality of route guidance apparatuses 10 that are mutually pre-registered automatically operate as a main device and sub devices based on the location relationship in the heading direction, and the route guidance apparatus 10 determined to be the main device can transmit the heading direction information to the route guidance apparatus 10 determined to operate as the sub device. Accordingly, when a plurality of users move in the same direction, the route guidance apparatus 10 used by a user at the lead operates as a main device without having to perform a complicated manipulation, thereby instructing and checking the heading direction of another users.

Also, since the heading direction information is displayed on the sub device based on the heading direction instruction of the main device without any manipulation, the heading direction can be checked safely and definitely. Also, when manipulation of instructing and checking the heading direction is performed by the touch panel manipulation unit 106, for example, the above manipulation may be safely performed even when the user is riding a bicycle.

Figure 17:
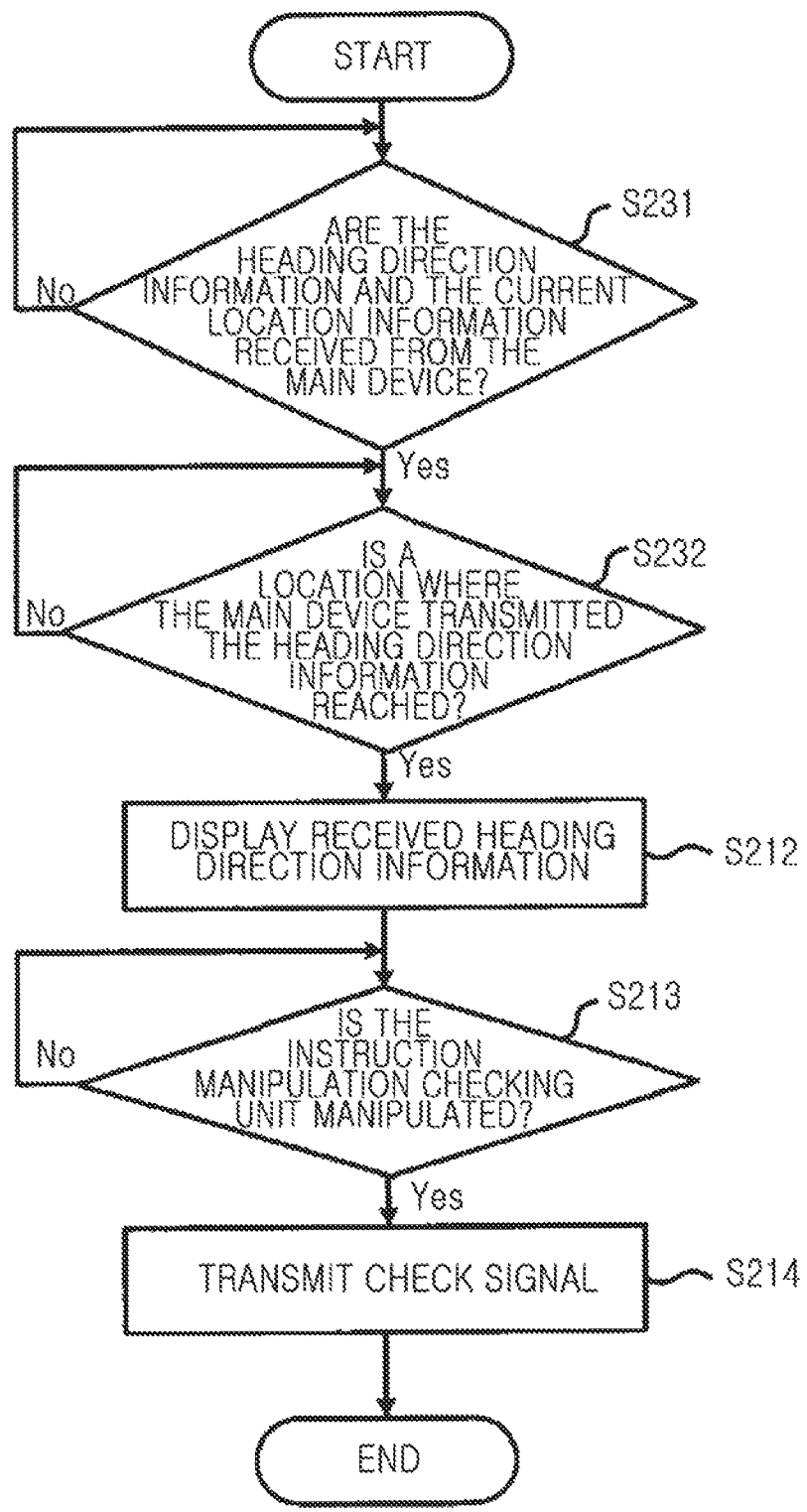
FIG. 17 is a flowchart showing an operation example of a sub device of a route guidance apparatus, according to the second embodiment of the present invention.

Next, operations of the route guidance apparatus 10 according to a second embodiment of the present invention will be described with reference to FIGS. 16 and 17. FIG. 16 is a flowchart showing operations of a main device, according to the second embodiment of the present invention, and FIG. 17 is a flowchart showing operations of a sub device. A configuration of the route guidance apparatus 10 according to the second embodiment is the same as that of the first embodiment, and descriptions about common processes will not be provided by denoting the same reference numerals.

In FIG. 16, if it is determined that the manipulation of the heading direction instruction is performed in operation S201 (operation S201: Yes), the communication controller 202 enables the communication unit 108 to transmit the current location information obtained by the location information obtainer 201, in addition to the heading direction information generated by the manipulation of the heading direction instruction performed in operation S201, to the another route guidance apparatus 10, in operation S222. The current location information transmitted at this time is current location information at a point of time when the heading direction instruction is manipulated, and the location information obtainer 201 may obtain the current location information at the point of time by detecting the manipulation of the heading direction instruction. Alternatively, the current location information may be latest current location information at the point of time when the heading direction instruction is manipulated based on current location information obtained at regular time intervals.

A start of the processes of FIG. 17 are the same as the first embodiment in FIG. 12, but in operation S231 of FIG. 17, the communication controller 202 determines whether not only the heading direction information from the main device but also the current location information of the main device is received at the point of time when manipulation of the heading direction instruction is performed. The transmitting of the heading direction information from the main device, determined in operation S231, is based on the process of operation S222 of FIG. 16.

In operation S231, when it is determined that the heading direction information and the current location information are not received from the main device (operation S231: No), operation S231 is performed again. When it is determined that the heading direction information and the current location information are received (operation S231: Yes), the location information obtainer 201 determines whether the current location of the subject apparatus as sub device reached a location where the manipulation of the heading direction instruction is performed by the main device in operation S232.

In operation S232, the current location may not completely match the location where manipulation of the heading direction instruction is performed by the main device, and the current location is determined to have reached the location when the current location is within a range from a 1-meter radius to a 5-meter radius of the location information of the main device.

Further to the same effect as the first embodiment, according to the above operations, the heading direction instruction is displayed on the route guidance apparatus 10 as the sub device when the route guidance apparatus 10 as the sub device reaches the location or is near the location where the route guidance apparatus 10 as the main device instructed the heading direction. Accordingly, the sub device may receive an accurate instruction without wrongly recognizing another intersection or the like as the intersection or the like to which the heading direction instructed by the main device is applied.

Figure 18:
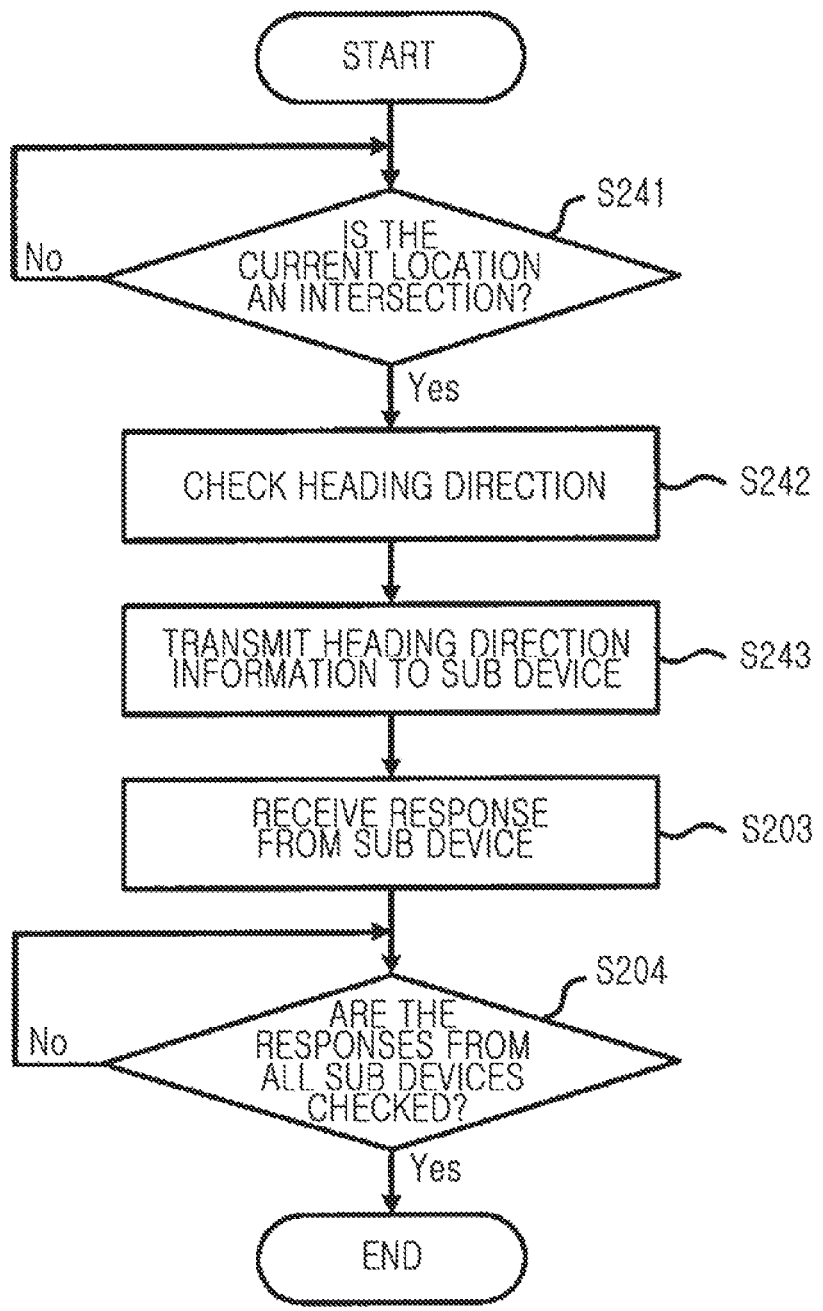
FIG. 18 is a flowchart showing an operation example of a main device of a route guidance apparatus, according to a third embodiment of the present invention.
Figure 19:
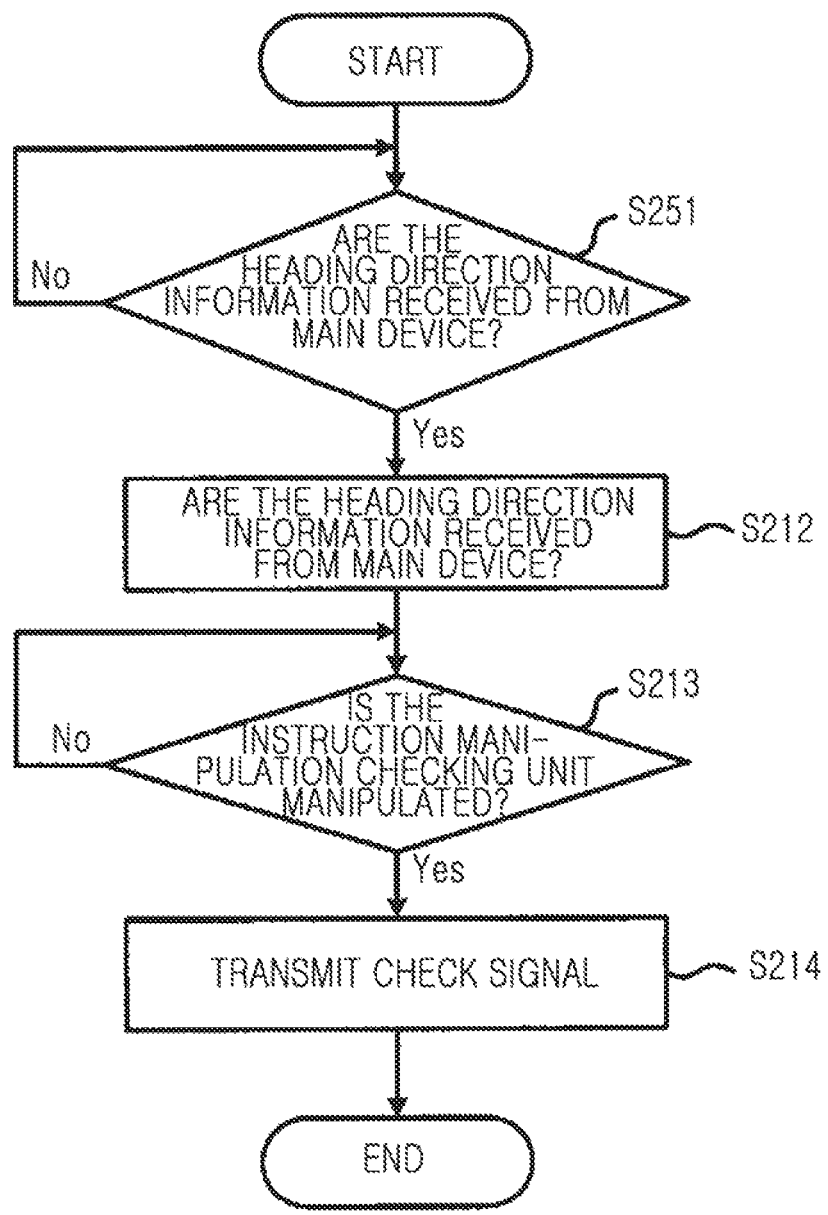
FIG. 19 is a flowchart showing an operation example of a sub device of a route guidance apparatus, according to the third embodiment of the present invention.

Next, operations of the route guidance apparatus 10 according to a third embodiment of the present invention will be described with reference to FIGS. 18 and 19. FIG. 18 is a flowchart showing operations of a main device according to the third embodiment of the present invention, and FIG. 19 is a flowchart showing operations of a sub device. A configuration of the route guidance apparatus 10 according to the third embodiment is the same as that of the first embodiment, and descriptions about common processes with the first and second embodiments are not provided by denoting the same reference numerals.

In FIG. 18, the controller 200 first determines whether the current location is an intersection based on the current location information obtained form the location information obtainer 201, and map data, in operation S241. In operation S241, the current location is determined to be the intersection even if the current location does not completely match latitude and longitude data showing location information of the intersection on the map data, if the current location is within a range from about a 1-meter radius to about a 10-meter radius based on the latitude and longitude data. The range may vary according to a width of road or a type of road forming the intersection.

In operation S241, if it is determined that the current location is not the intersection (operation S241: No), the process of operation S241 is performed again. In operation S241, otherwise, if it is determined that the current location is the intersection (operation S241: Yes), the location information obtainer 201 checks the heading direction at the intersection based on a progress of location information before and after the location information determined as the intersection, in operation S242.

After checking the heading direction at the intersection in operation S242, the communication controller 202 enables the communication unit 108 to transmit the heading direction information based on the heading direction checked in the process of operation S242 to the another route guidance apparatus 10 as a sub device, in operation S243.

In FIG. 19, the communication controller 202 determines whether the heading direction information at the intersection is received from the main device, in operation S251.

The flow of processes of the main device and the sub device according to the present embodiment will now be described by using the location relationship between the main device and the sub device shown in FIGS. 11A and 11B. When the user of the main device, who displayed the direction instruction screen 310, touches and manipulates the right turn instruction manipulation unit 312 at a location before reaching the intersection 301 shown in FIG. 11A, the direction check screen 317 shown in FIG. 148 is displayed on the sub device not at a location shown in FIG. 11B, but at a point of time when the sub device reached a location, where the direction instruction manipulation is performed by the main device as location of the another apparatus location icon 303 indicated in the heading direction from location of the subject location icon 302 of FIG. 11B.

According to the above operation, the plurality of route guidance apparatuses 10 that are mutually pre-registered automatically operate as a main device and sub devices based on the location relationship in the heading direction, and the route guidance apparatus 10 determined to be the main device can automatically transmit the heading direction information to the route guidance apparatus 10 determined to operate as the sub device. Accordingly, when a plurality of users move in the same direction, the route guidance apparatus 10 used by a user at the lead operates as a main device without having to perform a complicated manipulation, thereby instructing and checking the heading direction of another users.

Also, since the heading direction information automatically transmitted from the main device is displayed on the sub device, heading direction information based on wrong manipulation by the user of the route guidance apparatus 10 as the main device is not displayed. Thus, the heading direction information may be accurately checked.

Figure 20:
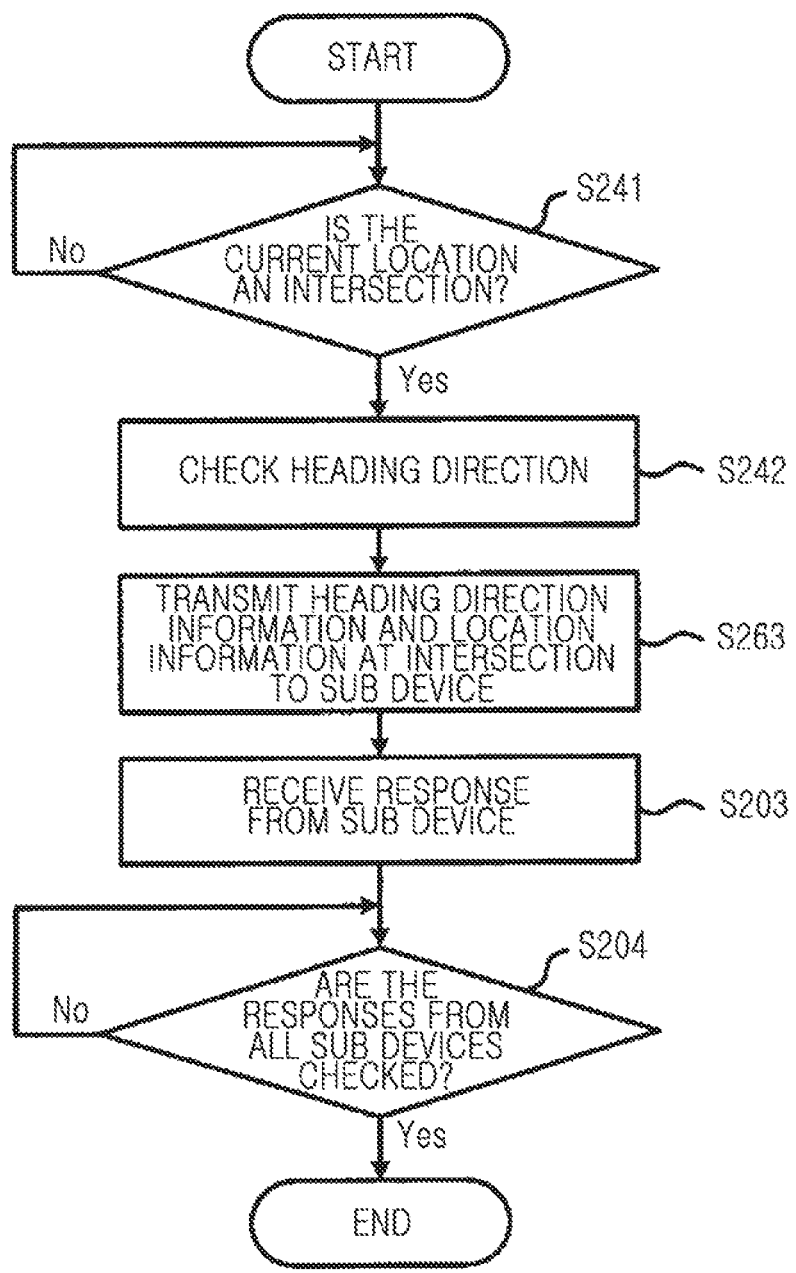
FIG. 20 is a flowchart showing an operation example of a main device of a route guidance apparatus, according to a fourth embodiment of the present invention.
Figure 21:
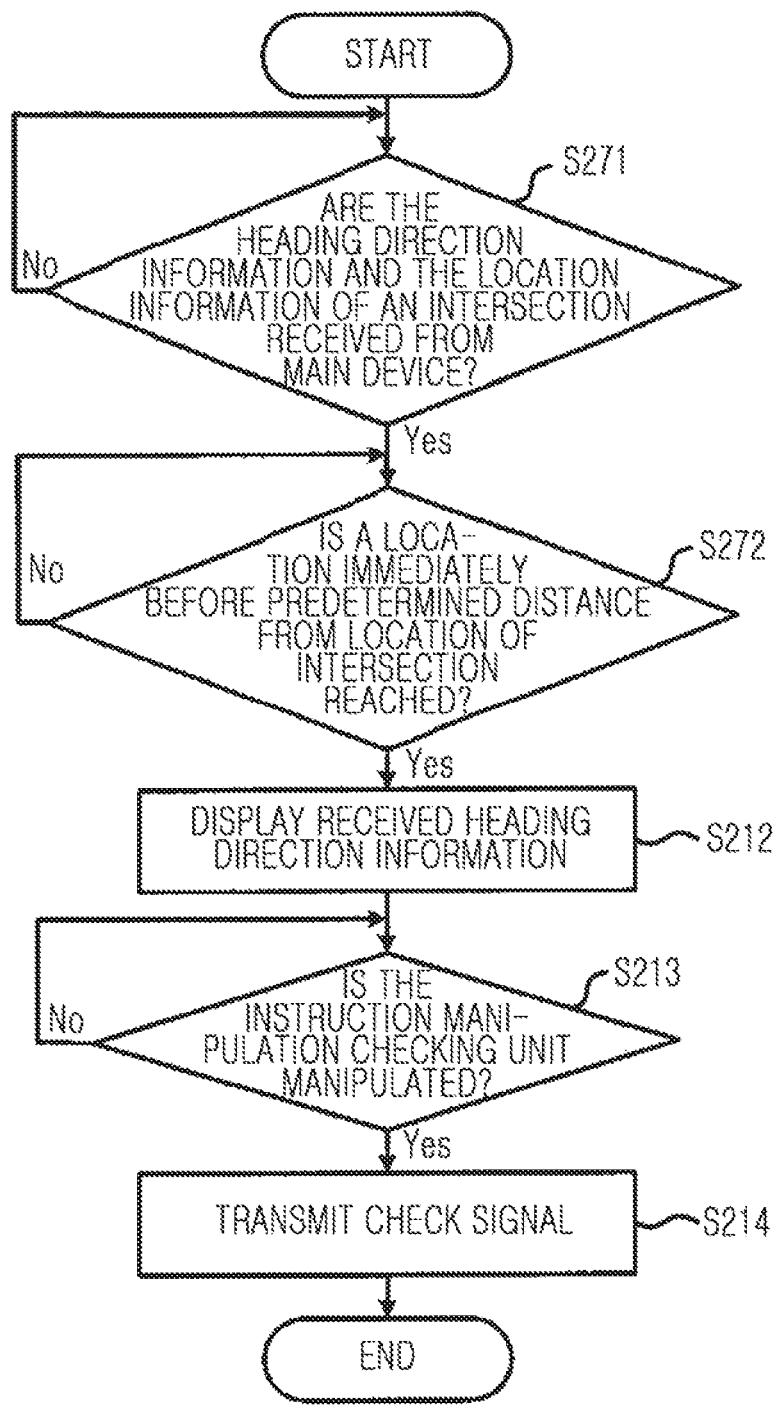
FIG. 21 is a flowchart showing an operation example of a sub device of a route guidance apparatus, according to the fourth embodiment of the present invention.

Next, operations of the route guidance apparatus 10 according to a fourth embodiment of the present invention will be described with reference to FIGS. 20 and 21. FIG. 20 is a flowchart showing operations of a main device according to the fourth embodiment of the present invention, and FIG. 21 is a flowchart showing operations of a sub device. A configuration of the route guidance apparatus 10 according to the fourth embodiment is the same as that of the first embodiment, and descriptions about the common processes with the first through third embodiments are not provided by denoting the same reference numerals.

In FIG. 20, after checking the heading direction at the intersection in operation S242, the communication controller 202 enables the communication unit 108 to transmit the location information at the intersection obtained by the location information obtainer 201 in addition to the heading direction information based on the heading direction checked in the process of operation S242 to the another route guidance apparatus 10, in operation S263.

In operation S271 of FIG. 21, the communication controller 202 determines whether the location information of the intersection is received in addition to the heading direction information at the intersection, from the main device. The transmitting of the heading direction information from the main device, determined in operation S271, is based on the process of operation S263 of FIG. 20.

In operation S271, if it is determined that the heading direction information and the location information of the intersection have not been received from the main device (operation S271: No), the determination of operation S271 is performed again. Otherwise, if it is determined that the heading direction information and the location information of the intersection have been received from the main device (operation S271: Yes), the location information obtainer 201 determines whether the intersection in the heading direction exists at the location which is immediately before a predetermined distance from the current location of the subject apparatus, in operation S272.

The determination of operation S272 is performed when the route guidance apparatus 10 as the sub device determines whether latitude and longitude information indicating the current location information of the subject apparatus is, for example, immediately before 10 m to 20 m from latitude and longitude information indicating an intersection transmitted from the main device in the heading direction obtained based on the progress of the current location information of the subject apparatus.

In operation S272, if it is determined that the location immediately before predetermined distance from the location information of the intersection has not been reached (operation S272: No), the determination of operation S271 is performed again. Otherwise, if it is determined that the location before the predetermined distance has been reached (operation S272: Yes), the display controller 206 displays the direction check screen 317 shown in FIG. 14B on the display unit 101 and displaying the heading direction based on the heading direction information received from the main device on the instruction display unit 318 of the direction check screen 317, in operation S212.

According to the above operation, in addition to the same effect as the third embodiment, an instruction of the heading direction is displayed on the route guidance apparatus 10 as the sub device immediately before the predetermined distance from the intersection where the heading direction is instructed by the main device. The instruction of the heading direction is displayed when the route guidance apparatus 10 as a sub device reaches the location of the intersection. Accordingly, the instruction may be accurately received without wrongly recognizing an intersection or the like as the intersection or the like to which the heading direction instructed by the main device is applied.

Next, the route guidance apparatus 10 according to a fifth embodiment of the present invention is described with reference to FIG. 22. In the fifth embodiment, the route guidance apparatus 10 determined to be a sub device is different from those of other embodiments only in a processing of received heading direction information.

Figure 22A:
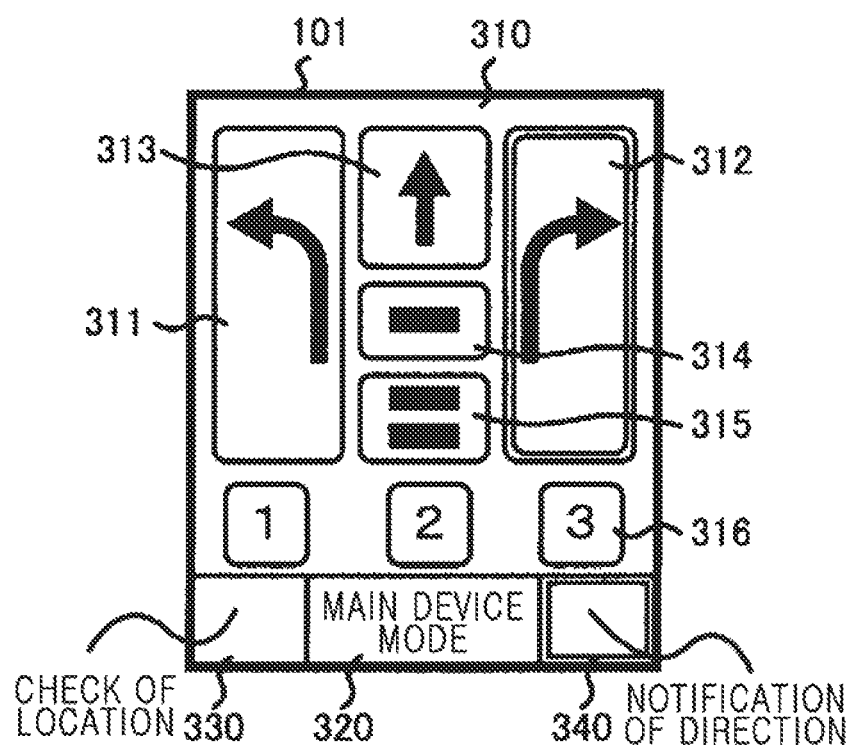

In detail, when heading direction information is received from a main device, the instruction display unit 318 indicating an azimuth of a heading direction of the main device is displayed on the direction check screen 317 as shown in FIG. 22B, based on location information of the main device and map data about a location of the main device.

For example, when the right turn instruction manipulation unit 312 of the main device is manipulated, and the sub device receives any one of heading direction information received from the main device, heading direction information of the main device, current location information of the main device, and intersection location information is received from the main device, the controller 200 of the sub device obtains a route in an instructed direction from map information when the main device turns right according to such information.

Next, sub device obtains a direction in the obtained route and selects and displays a closest azimuth from among azimuths generally used, for example, "East", "Southeast", and "south-southeast" on the instruction display unit 318 along with a direction instruction pointer 318b.

A device that does not display the direction instruction pointer 318b on the instruction display unit 318 may display a top direction of the display unit 101 to be north.

The fifth embodiment is suitable since a direction instruction based on an azimuth may be an instruction preventing a group climbing a mountain or trekking from wandering around a route.

In the fifth embodiment, the direction instruction screen 310 of the main device is same as those of other embodiments, but alternatively, the direction instruction screen 310 is not limited as long as it can instruct an azimuth.

In the each embodiment described above, a direction is instructed by only being displayed on a screen, but when a sub device receives heading direction information or the like from a main device, the reception of the heading direction information may be notified to the user via audio output by a vibration device 1036 or speaker 1033 as an output unit. Also, the direction may be instructed via both the screen and audio. Here, audio pre-stored in the storage unit 104 or ROM 2003 is used as the audio.

When an image using an image pickup device 1024 of the main device is attached to the heading direction information transmitted by the main device, the attached image may be displayed with the instruction display unit 318 on the direction check screen 317 of the sub device. At this time, the image may be attached by being arbitrarily captured at a location where the user of the main device instructs a direction, or automatically captured simultaneously when receiving a signal in which the direction instruction screen 310 of the main device is manipulated. When the route guidance apparatus 10 is provided on a bicycle, the display unit 101 may be mounted facing upward and the image pickup device 1024, a lens concentrating an image on the image pickup device 1024, etc. may be disposed on a surface facing the heading direction of the route guidance apparatus 10.

The heading direction information transmitted by the main device may include time information about a time when the direction instruction screen 310 of the main device is manipulated, or distance information about a distance between the main device and the sub device at a point of time when the direction instruction screen 310 of the main device is manipulated. When a plurality of sub devices exist, pieces of distance information about distances between the sub devices may be transmitted to each sub device. When the sub device receives the heading direction information including time or distance information, the sub device displays the time or distance information in addition to an instruction of the heading direction. Accordingly, the user of the sub device can more accurately determine the location when the direction instruction screen 310 of the main device is manipulated In processes (operations S114 and S115) performed by the operation mode determiner 204 of FIG. 9, when a location relationship between the main device and the sub device is changed, the main device mode and the sub device mode may be switched after maintaining the location relationship for a predetermined time, for example, 1 minute. For example, when the main device and the sub device move side-by-side or the location relationship is changed only for a short period of time, the location relationship of the main device and the sub device is maintained, thereby preventing the user from being confused.

According to the present invention, a suitable route guidance may be performed with respect to each location relationship via communication between a plurality of apparatuses.

While this invention has been particularly shown and described with reference to exemplary embodiments thereof, it will be understood by one of ordinary skill in the art that various changes in form and details may be made therein without departing from the spirit and scope of the invention as defined by the appended claims.

What is claimed is:

1. A route guidance apparatus comprising:
a location information obtainer which obtains current location information of a subject apparatus;
a communication controller which transmits the current location information of the subject apparatus obtained by the location information obtainer to another pre-registered apparatus, and receives current location information of the another pre-registered apparatus;
a location relationship determiner which determines whether the subject apparatus precedes the another pre-registered apparatus in a heading direction, based on a location relationship of the subject apparatus and the another pre-registered apparatus with respect to the heading direction of the subject apparatus, wherein the location relationship is determined according to the current location information of the subject apparatus obtained by the location information obtainer and the current location information of the another pre-registered apparatus obtained by the communication controller;
an operation mode determiner which operates the subject apparatus as a main device when the location relationship determiner determines that the subject apparatus precedes the another pre-registered apparatus in the heading direction, and operates the subject apparatus as a sub device when the location relationship determiner determines that the subject apparatus does not precede the another pre-registered apparatus in the heading direction; and
a function selector which enables the communication controller to transmit to the another pre-registered apparatus heading direction information indicating the heading direction when the operation mode determiner determines that the subject apparatus is a main device, and enables the communication controller to receive the heading direction information from the another pre-registered apparatus determined to be a main device when the operation mode determiner determines that the subject apparatus is a sub device.

2. The route guidance apparatus of claim 1, further comprising a display controller which displays the heading direction information received from the another pre-registered apparatus according to the operation of the function selector, when the operation mode determiner determines that the subject apparatus is a sub device.

3. The route guidance apparatus of claim 2, wherein the display controller displays the heading direction information received from the another pre-registered apparatus according to the operation of the function selector, based on the current location information of the another pre-registered apparatus determined to be a main device at a point of time when the heading direction is transmitted, wherein the current location information is received by the communication controller.

4. The route guidance apparatus of claim 1, wherein, when the operation mode determiner determines that the subject apparatus is a sub device, the function selector enables the communication controller to transmit heading direction check information with respect to the received heading direction information.

5. A route guidance method using a route guidance apparatus comprising a location information obtainer, a communication controller, a location relationship determiner, an operation mode determiner and a function selector, the method comprising:
a current location information obtaining process in which the location information obtainer obtains current location information of a subject apparatus;
a location information transmitting-receiving process in which the communication controller mutually performs transmitting the current location information of the subject apparatus obtained in the current location information obtaining process and obtaining current location information of another apparatus, as pre-registered apparatuses communicate with each other;
a location relation determination process in which the location relationship determiner determines a location relationship of the subject apparatus and the another apparatus with respect to a heading direction of the subject apparatus, based on the current location information of the subject apparatus obtained in the current location information obtaining process and the current location information of the another apparatus obtained in the location information transmitting-receiving process;
a operation mode determination process in which the operation mode determiner operates the subject apparatus as a main device when it is determined that the subject apparatus precedes the another apparatus in the heading direction, and operates the subject apparatus as a sub device when it is determined that the subject apparatus does not precede the another apparatus in the heading direction, in the location relation determination process; and a function selection process in which the function selector enables the communication controller to transmit heading direction information indicating the heading direction to the another apparatus when the subject apparatus is determined to be a main device, and enables the communication controller to receive the heading direction information from the another apparatus determined to be a main device when the subject apparatus is determined to be a sub device, in the operation mode determination process.

6. A non-transitory computer-readable storage medium with an executable program stored thereon, the program operating a computer included in a route guidance apparatus comprising a location information obtainer, a communication controller, a location relationship determiner, an operation mode determiner and a function selector, and comprising:

a current location information obtaining process in which the location information obtainer obtains current location information of a subject apparatus;

a location information transmitting-receiving process in which the communication controller mutually performs transmitting the current location information of the subject apparatus obtained in the current location information obtaining process and obtaining current location information of another apparatus, as pre-registered apparatuses communicate with each other;

a location relation determination process in which the location relationship determiner determines a location relationship of the subject apparatus and the another apparatus with respect to a heading direction of the subject apparatus, based on the current location information of the subject apparatus obtained in the current location information obtaining process and the current location information of the another apparatus obtained in the location information transmitting-receiving process;

a operation mode determination process in which the operation mode determiner operates the subject apparatus as a main device when it is determined that the subject apparatus precedes the another apparatus in the heading direction, and operates the subject apparatus as a sub device when it is determined that the subject apparatus does not precede the another apparatus in the heading direction, in the location relation determination process; and a function selection process in which the function selector enables the communication controller to transmit heading direction information indicating the heading direction to the another apparatus when the subject apparatus is determined to operate as a main device, and enables the communication controller to receive the heading direction information from the another apparatus determined to be a main device when the subject apparatus is determined to operate as a sub device, in the operation mode determination process.

* * * * *